(12) United States Patent
Nazzaro et al.

(10) Patent No.: US 12,022,021 B2
(45) Date of Patent: Jun. 25, 2024

(54) BAND ADJUSTMENT FOR ELECTRONIC DEVICES

(71) Applicant: Apple Inc., Cupertino, CA (US)

(72) Inventors: David I. Nazzaro, Groveland, MA (US); Erik G. De Jong, San Francisco, CA (US); Steven J. Martisauskas, San Francisco, CA (US); Tyler S. Bushnell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 17/386,316

(22) Filed: Jul. 27, 2021

(65) Prior Publication Data

US 2021/0360100 A1 Nov. 18, 2021

Related U.S. Application Data

(60) Continuation of application No. 15/868,711, filed on Jan. 11, 2018, now abandoned, which is a division of application No. 14/640,946, filed on Mar. 6, 2015, now abandoned.

(51) Int. Cl.
*H04M 1/72454* (2021.01)
*H04B 1/3827* (2015.01)

(52) U.S. Cl.
CPC ........ *H04M 1/72454* (2021.01); *H04B 1/385* (2013.01)

(58) Field of Classification Search
CPC .......... H04M 1/72569; H04M 1/72454; H04B 1/385; G04C 3/002; G06F 2200/1636; G06F 2203/04105; G06F 1/163; G06F 1/1694; G06F 3/016; G06F 3/017
See application file for complete search history.

(56) References Cited

U.S. PATENT DOCUMENTS

| | | |
|---|---|---|
| 4,935,700 A | 6/1990 | Garbini |
| 5,345,807 A | 9/1994 | Butts |
| 5,440,237 A | 8/1995 | Brown |
| 6,275,087 B1 | 8/2001 | Dehghan |
| 8,055,226 B2 | 11/2011 | He et al. |
| 8,265,308 B2 | 9/2012 | Gitzinger et al. |
| 8,935,637 B2 | 1/2015 | Kim et al. |
| 8,959,458 B2 | 2/2015 | Kim et al. |
| 9,042,971 B2 | 5/2015 | Brumback et al. |
| 9,171,434 B2 | 10/2015 | Faaborg et al. |
| 9,288,305 B2 | 3/2016 | Turunen |
| 9,329,723 B2 | 5/2016 | Benbasat et al. |
| 9,397,850 B2 | 7/2016 | Agsteiner et al. |

(Continued)

*Primary Examiner* — Marcus Hammonds
(74) *Attorney, Agent, or Firm* — Brownstein Hyatt Farber Schreck, LLP

(57) ABSTRACT

Systems and methods for performing damping analyses on a device are disclosed. The damping analyses may be used by a device in numerous ways. For example, in some embodiments, damping analyses are used to determine whether a device is being worn or held by a user. In some embodiments, damping analyses are used to determine which user of multiple users is wearing a device. In some embodiments, damping analyses are used to determine the body composition of a user who is holding or wearing the device. In some embodiments, damping analyses are used to determine how much force a user is applying to a device via a touch input. In some embodiments, damping analyses are used to determine whether and to what extent a sensor is in contact with a body of a user.

20 Claims, 14 Drawing Sheets

(56) References Cited

U.S. PATENT DOCUMENTS

| | | |
|---|---|---|
| 9,696,221 B2 | 7/2017 | Lauzier et al. |
| 9,885,627 B2 | 2/2018 | Gowreesunker et al. |
| 2006/0105817 A1 | 5/2006 | Naick et al. |
| 2014/0070042 A1 | 3/2014 | Beers et al. |
| 2014/0354527 A1 | 12/2014 | Chen et al. |
| 2016/0070404 A1 | 3/2016 | Kerr et al. |
| 2016/0071408 A1 | 3/2016 | Jiao et al. |
| 2016/0120734 A1 | 5/2016 | Ishikawa |
| 2016/0204332 A1 | 7/2016 | Hunt |
| 2017/0090667 A1 | 3/2017 | Abdollahian et al. |

BAND ADJUSTMENT FOR ELECTRONIC DEVICES

CROSS-REFERENCE TO RELATED APPLICATIONS

This application is a continuation of U.S. patent application Ser. No. 15/868,711, filed Jan. 11, 2018, which is a divisional of U.S. patent application Ser. No. 14/640,946, filed Mar. 6, 2015, now Abandoned, the contents of which are incorporated herein by reference as if fully disclosed herein.

TECHNICAL FIELD

Embodiments described herein relate to systems and methods for determining an amount of damping to which an electronic device is subjected, and to systems and methods for determining conditions or properties of the user and/or the device based on such determinations.

BACKGROUND

Some electronic devices are intended to be held by or attached to a user. For example, a smartwatch or fitness/health tracking device can be attached to a user's wrist via a band or strap; a smartphone or tablet computer may be held in the user's hand; a laptop computer may be placed on the user's lap. Various device operations, features, and functions may depend on or be affected by whether and to what extent the device is in contact with a user.

For example, users may have different preferences for how a device operates when it is in contact with the user versus when the device is not in contact with the user. For example, a user may wish that a smartphone or smartwatch uses vibrations to notify the user of certain events (e.g., incoming messages) when the electronic device is attached to or being held by the user. On the other hand, the user may prefer that the device does not use vibrations for notifications when the device is resting on a table, as the noise from such vibrations may be amplified by the surface of the table and may be bothersome.

As another example, devices may include body-contacting sensors that require a certain amount of contact with a body in order to function properly. Thus, the extent and quality of a coupling between the user and the device (which may be effected by the tightness of a watch band or the tightness of a user's grip on a smartphone) may impact whether or not a body-contacting sensor can acquire accurate measurements.

Thus, it may be desirable for a device to know whether and to what extent the device is in contact with a user. In some cases, devices may rely on a user's affirmative selection or confirmation of a device's location or level of contact with the user. For example, a smartwatch or smartphone may require the user to interact with a switch or other affordance in order to affirmatively indicate whether it is being worn or held by the user. As another example, a smartwatch or other device with a body-contacting sensor (e.g., a biometric sensor) may require a user to confirm whether the sensor is in contact with the user's body before a sensor reading is taken. These techniques can be cumbersome, and many users may not take the time or effort to provide such affirmative selections, thus reducing the functionality and usefulness of the device. Accordingly, it would be beneficial for electronic devices to determine whether and to what extent the devices are in contact with a body of a user.

SUMMARY

Embodiments described herein may provide systems and methods that include or use a vibrating element and a motion detector to determine properties relating to the physical contact of electronic devices with users of the electronic devices. In particular, as described herein, vibrations imparted to an electronic device, which may be caused by vibrating elements in or attached to the electronic device, may be damped by the device's contact with a body of a user. The presence or amount of such damping may be used to make determinations about numerous properties of the user and/or the user-device interaction, including but not limited to how tightly the user is holding the device, how tightly the device is secured to the user, how the user's body composition has changed over time, quantitative estimates of a user's body composition, how much force is being applied to a device during a touch-based interaction with the device, and the like.

Specifically, embodiments described herein may relate to, include, or take the form of a method of determining physical placement of a device, including inducing motion of the device, capturing motion data representative of the induced motion of the device, and determining whether the captured motion data satisfies a first condition indicating that the device is subjected to a physical damping threshold. In accordance with a determination that the captured motion data satisfies the first condition, it is determined that the device is in contact with a body of a user.

Other embodiments described herein may relate to a method of detecting a change in body composition of a user of an electronic device, including at a first time, inducing first motion of the device and capturing first motion data representative of the first motion of the device, at a second time later than the first time, inducing second motion of the device, and capturing second motion data representative of the second motion of the device. Based on the first and second motion data, a difference in body composition of the user between the first time and the second time is calculated.

Other embodiments described herein may relate to a method of adjusting a fit of a band for an electronic device, including inducing motion of the device, and capturing motion data representative of the induced motion of the device. Based on the captured motion data, it is determined whether the band is looser than a target tightness. In accordance with a determination that the band is looser than the target tightness, the band is tightened.

Other embodiments described herein may relate to a method of identifying a wearer of an electronic device, including imparting a physical impulse to the device such that motion of the device is induced, and capturing motion data representative of the induced motion of the device. It is determined whether the captured motion data is within a similarity threshold to first reference motion data, where the first reference motion data corresponds to expected motion of the device in response to the physical impulse when the device is worn by the first user. In accordance with a determination that the captured motion data is within the similarity threshold, it is determined that the device is in contact with a first user, and, in accordance with a determination that the captured motion data is not within the similarity threshold, it is determined that the device is not in contact with the first user.

Other embodiments described herein may relate to a method of detecting contact between a sensor and a user, including inducing motion of the device, and capturing motion data representative of the induced motion of the device. It is determined whether the captured motion data satisfies a first condition, where the first condition indicates that an amount of the body-contacting sensor surface that is in contact with a body of a user satisfies a threshold value. In accordance with a determination that the captured motion data satisfies the first condition, measurement of a biometric value with the biometric sensor is enabled.

Other embodiments described herein may relate to a method of detecting an amount of body contact between a sensor and a user, including inducing motion of the device, and capturing motion data representative of the induced motion of the device. An amount of physical damping to which the device is subjected is determined based on the captured motion data. An amount of the body-contacting sensor surface that is in contact with a body of the user is estimated, based on the amount of physical damping to which the device is subjected.

Other embodiments described herein may relate to a method of detecting a force of a contact with an electronic device, including, during a touch event between a user and the device, inducing motion of the device, and capturing motion data representative of the induced motion of the device. An amount of physical damping to which the device is subjected is determined based on the captured motion data. An amount of force imparted to the device by the user is estimated based on the amount of physical damping to which the device is subjected.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings can indicate similar, related, or identical items.

DETAILED DESCRIPTION

Figure 1:
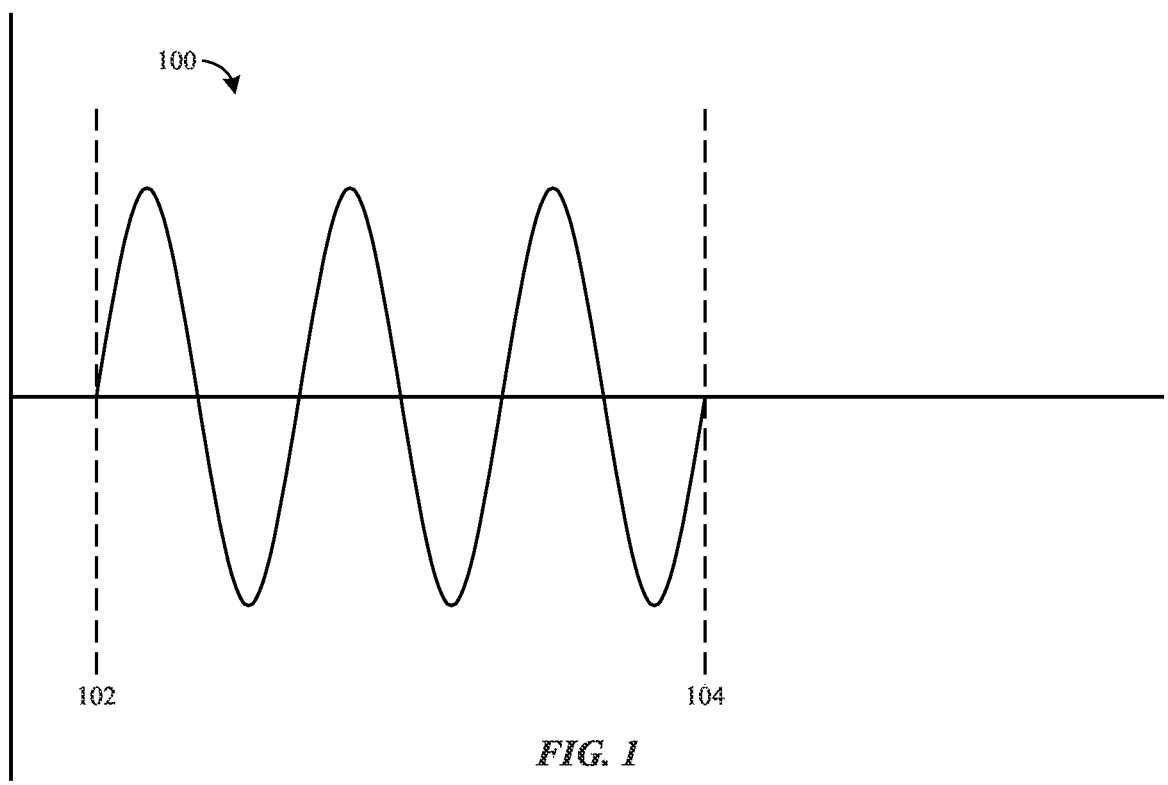
FIG. 1 depicts a waveform representing a physical impulse that may be applied to a device.

Embodiments described herein relate to systems and/or methods that include or use an actuator (e.g., a vibrating element) and a motion detector to determine properties relating to the physical contact of electronic devices with users of the electronic devices. In particular, when an actuator in or coupled to a device imparts a physical impulse to the device (e.g., a vibratory impulse), the impulse may induce motion in the device. However, the particular properties of the motion that is induced may depend, at least in part, on the physical damping influences to which the device is subjected. For example, for a vibration of a given amplitude and frequency, a device that is subject to less damping (e.g., a device that is resting on a hard surface such as a tabletop) will move differently than if the device were subject to more damping (e.g., a device held in a user's hand). This property may be exploited for various purposes, as described herein. For example, by imparting a physical impulse to the device, and then monitoring the device's resulting motion to determine the physical response of the device to the impulse, the device can acquire data that is useful for many different purposes. Monitoring and/or analyzing the motion resulting from a physical impulse, such as a vibratory impulse, may be referred to herein as a damping analysis. Systems and methods for performing damping analyses are described herein.

One example purpose for which damping analyses may be used is to determine whether or not the device is contacting the user's body. Specifically, if motion resulting from a physical impulse is consistent with an undamped or slightly damped condition, the device may determine that it is not in contact with a user. On the other hand, if the resulting motion is consistent with a highly damped (or more damped) condition, the device may determine that it is in contact with the user. Once the device determines whether or not it is in contact with a user, the device may take (or refrain from taking) certain actions. For example, the device may select to deactivate vibration notifications if the device is not in contact with a user. As another example, the device may go into a low-power mode if the device is not in contact with a user.

Similarly, damping analyses may be used to determine whether or not a body-contacting sensor is in contact with a body of a user, and even to determine, quantitatively, how much of a body-contacting surface is in contact with a user. For example, a health-related sensor may have a sensing surface that needs to be in complete contact with the body of a user in order to acquire accurate measurements. Performing a damping analysis when the body-contacting sensor is to be used may allow the device to determine whether the sensor is in sufficient contact with the user. In particular, a device may be subject to more damping from a user's body when it is tightly secured to the user than when the device is only loosely secured (and, thus, when the sensor is only loosely or only partially in contact with the user's body). Accordingly, a determination that the device is not subject to a target level of damping may indicate that the device is not attached to the user securely enough to enable accurate measurements by the sensor. Conversely, a determination that the device is subject to a target or threshold level of damping may indicate that the body-contacting sensor is in sufficiently contact with the body of the user to enable accurate measurements.

Another example purpose for which damping analyses may be used is to determine aspects of a user's body composition, or to detect changes to a user's body composition over time. For example, higher values of body mass index (BMI) may result in more damping on a device than lower values. Thus, a smartwatch, for example, may estimate a user's BMI based on the amount of damping detected in response to a physical impulse. Similarly, based on different readings from a given user at different times, a smartwatch may determine whether the user's BMI has increased or decreased. Other physical characteristics of a user's body that may affect damping, and, therefore, that may be detected include body water, body fat percentage, and the like.

As yet another example, a smartwatch that automatically tightens a band that couples the smartwatch to a user may use a damping analysis to determine the tightness of the band. For example, during a setup or calibration procedure, a user may secure a smartwatch to his or her wrist via a watch band, manually set the band to a desired tightness, and the smartwatch may then determine how much damping the device experiences at that time. When the user applies the smartwatch at a later time, the device may tighten or loosen the band until it detects that the smartwatch is subject to the same amount of damping that was present during the setup procedure. Systems and methods of dynamically adjusting the tightness of a band are described in U.S. patent application application Ser. No. 14/691,217, now U.S. Pat. No. 9,781,984, which is hereby incorporated herein as if set forth fully in this document.

As yet another example, a device may determine the identity of a user by comparing a result from a damping analysis to a known reference result for that person. In particular, during an initialization sequence for a particular user, a user may attach a device (e.g., a smartwatch) to their body, and the device may then perform a damping analysis in order to generate reference motion data. Later, when the device is determined to once again be attached to a user, the device performs another damping analysis to determine whether or not the results are the same or similar to the reference motion result. If the results are sufficiently similar, the device may determine that the wearer is the particular user. If the results are not sufficiently similar, the device may instead determine that the wearer is not the particular user. The device may operate differently depending on whether or not a known user is wearing the device. For example, information, data, applications, and the like, may be restricted or entirely unavailable to unknown users. In some embodiments, multiple users may register with a single device. In such cases, the device may identify which particular user is wearing or holding the device, and apply the appropriate settings for the identified user.

Damping analyses may also be used to determine an amount of force that is being applied to a device by a user, such as the amount of force imparted on a touchscreen (or other input device) by a user's finger, stylus, or other object. In particular, the amount of force applied by a user to a device when the user is interacting with the device (e.g., via touch-based inputs) may affect how much damping the device is subjected to. Accordingly, a damping analysis may be performed during touch-based interactions to determine or estimate how much force the user is applying.

In each of the example uses described above, an electronic device uses damping analysis to determine a property or condition of the device and/or the device's environment (e.g., whether the device is attached to a user, how securely or tightly a device is attached to a user, and the like). As noted above, such damping analyses are based on the fact that external objects in contact with the device will change how the device responds to a given physical impulse. In particular, when a physical impulse with known parameters is imparted to a device, the characteristics of the induced motion can be used to determine, in either absolute or relative terms, how much damping the device is subject to. The amount of damping, in turn, can be correlated with many different possible conditions or properties of the device and/or a user's interaction with the device, as described herein.

FIG. 1 depicts a waveform 100 representing a physical impulse that may be applied to a device. While the waveform 100 is an oscillating input, which may correspond to a vibration generated by a vibrating element or other haptic component of an electronic device, this is only one example of a physical impulse that may be used. For example, in other embodiments, instead of an oscillating input, the physical impulse only has a single direction. Such an impulse may result from a linear actuator moving a mass in one direction. For clarity, the following discussion refers to a vibratory input and oscillatory motion that results from the vibratory input. One of ordinary skill in the art will recognize, however, that the principles described also apply to non-vibrating physical impulses and non-oscillatory motion that results from such an input.

The vibration corresponding to the waveform 100 starts at point 102, and ends at point 104. The waveform 100 (also referred to as "input 100") represents and illustrates the oscillatory nature of a vibratory input, but is not necessarily representative of any particular motion of the device. Moreover, the waveform 100 may be generated in any appropriate way and by any appropriate vibrating element. In some embodiments, vibrations are applied to a device by spinning an unbalanced mass. In some embodiments, vibrations are applied to a device by oscillating a mass along a linear axis. In many cases, devices such as smartphones, smartwatches, and/or tablet computers include vibrating elements that are used for notifications and other user feedback. Such vibrating elements, also referred to as haptic output devices, may be used to generate the vibrations represented in the waveform 100.

Figure 2A:
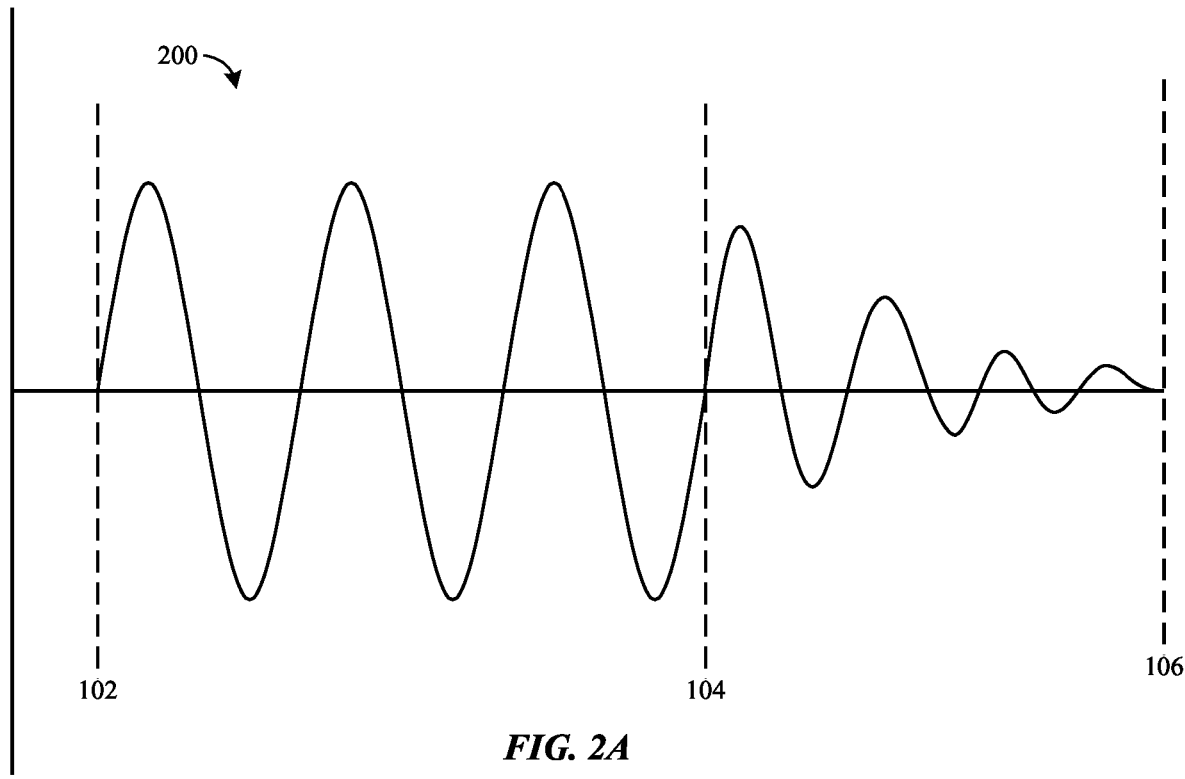
FIGS. 2A-2C depict respective waveforms representative of detected motion after application of a physical impulse, for different respective damping conditions.

In some embodiments, a motion detector (described herein) is used to detect the motion of the device that resulted from the vibrations. FIG. 2A illustrates a waveform 200 representative of detected motion of the device in response to the vibratory input represented by waveform 100. In this case, the response may be illustrative of a condition where the device is subject to relatively low damping influences, such as when the device is resting on a hard surface, or is otherwise subject to a minimum amount of damping that is expected during normal use of the device.

In particular, between time 102 and time 104, the device oscillates substantially in-phase with the waveform 100

(though this need not necessarily be the case, as the physical properties of the device and the device's surroundings may cause the motion of the device to be out-of-phase with the physical impulse during application of the impulse). After the vibratory impulse ceases (i.e., after time 104), the device continues to oscillate until time 106, but the amplitude of the oscillations begin to decay after time 104 until the device is no longer moving (time 106). The decaying amplitude across the various oscillations is caused by the combination of damping that is inherent to the device and damping that is applied to the device by virtue of the device's physical contact with surrounding objects (e.g., a surface of a table or desk). In this case, because the damping is relatively low, the oscillations continue beyond the termination of the input 100 for several cycles.

Figure 2B:
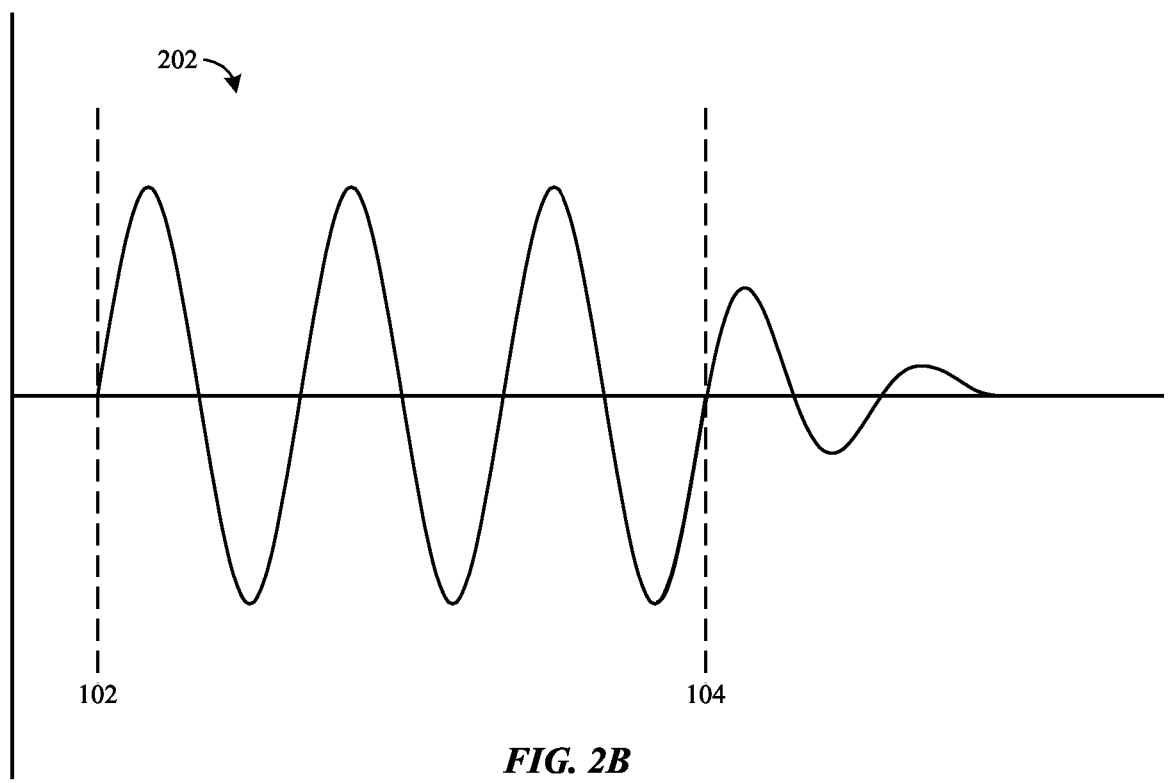

FIG. 2B illustrates a waveform 202 representative of detected motion of the device in response to the input 100 when the device is subject to different damping conditions and/or influences. Whereas the waveform 200 continued for numerous cycles, the amplitude of the waveform 202 attenuates more rapidly, oscillating only for a few cycles. The more dramatic attenuation illustrated in the waveform 202 may be attributable to the device being subjected to greater damping influences. For example, whereas the waveform 200 may result when the device is resting on a hard surface, the waveform 202 may result when the device is in a user's pocket, purse, briefcase, or is otherwise supported by one or more objects that are more compliant, and, thus, provide greater damping.

Figure 2C:
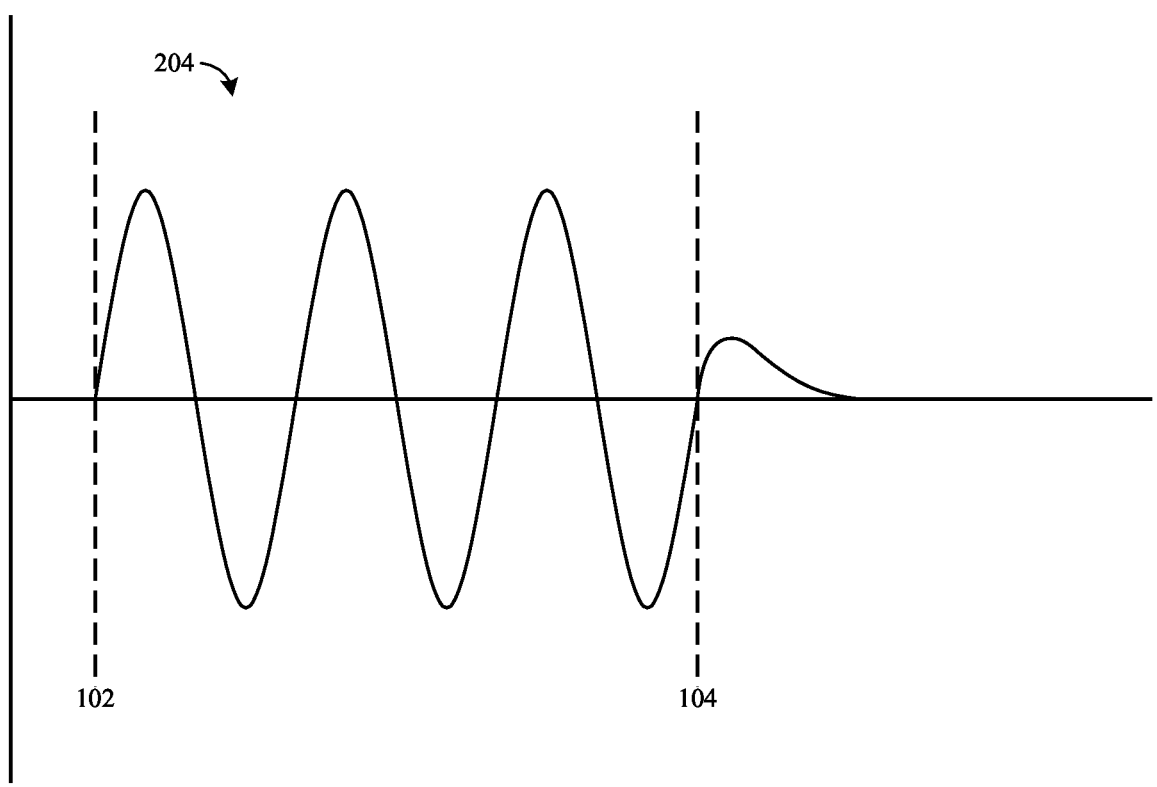

FIG. 2C illustrates a waveform 204 representative of detected motion of the device in response to the input 100 when the device is subject to yet other damping conditions and/or influences. Whereas the waveforms 200 and 202 continued for several cycles after removal of the input 100 (at time 104), the amplitude of the oscillations in waveform 204 decay rapidly to zero. The attenuation illustrated in the waveform 204 may be attributable to the device being securely held in the user's hand, strapped to a user's wrist, or otherwise secured to a user.

Figure 3A:
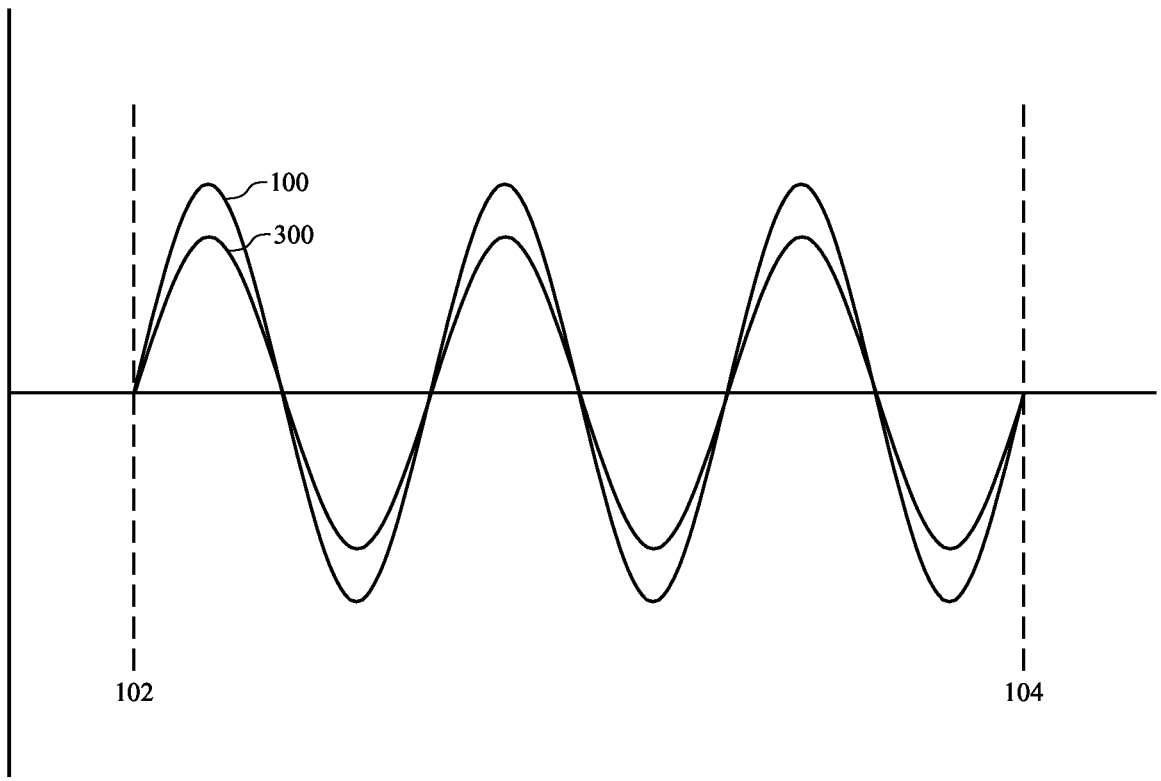
FIGS. 3A-3C depict respective waveforms representative of detected motion during application of a physical impulse, for different respective damping conditions.

In the foregoing description, device motion is detected once the physical impulse is removed, and the damping analysis is based on the physical motion of the device only after the impulse is removed. In other cases, the motion is detected while the physical impulse is being generated. In such case, the physical damping to which the device is subjected may cause the device to physically respond to the impulse in a predictable and/or measurable manner, even though the resulting motion of the device while the impulse is being generated does not exhibit decay as shown in FIGS. 2A-2C. For example, FIG. 3A illustrates a waveform 300 representative of detected motion of the device in response to the vibratory input represented by waveform 100. The waveform 100 is superimposed on the coordinates for clarity. Because the motion detection occurs during the physical impulse, the motion is substantially in-phase with the physical impulse (though this need not be the case, as noted above).

In FIG. 3A, the waveform 300 may correspond to the motion of the device when the device is resting on a hard surface, or is otherwise subject to a minimum amount of damping that is expected during normal use of the device. A damping analysis on a waveform similar to the waveform 300, then, may result in a determination that the device is subject to little or no damping.

Figure 3B:
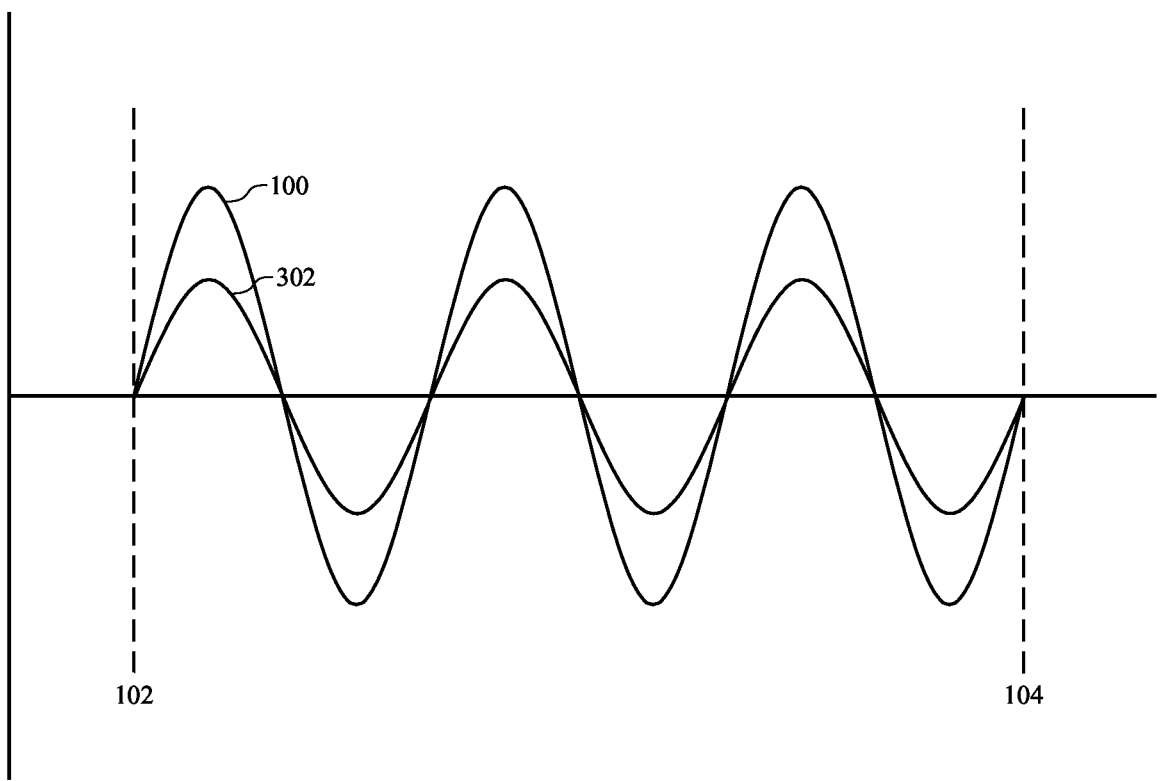
Figure 3C:
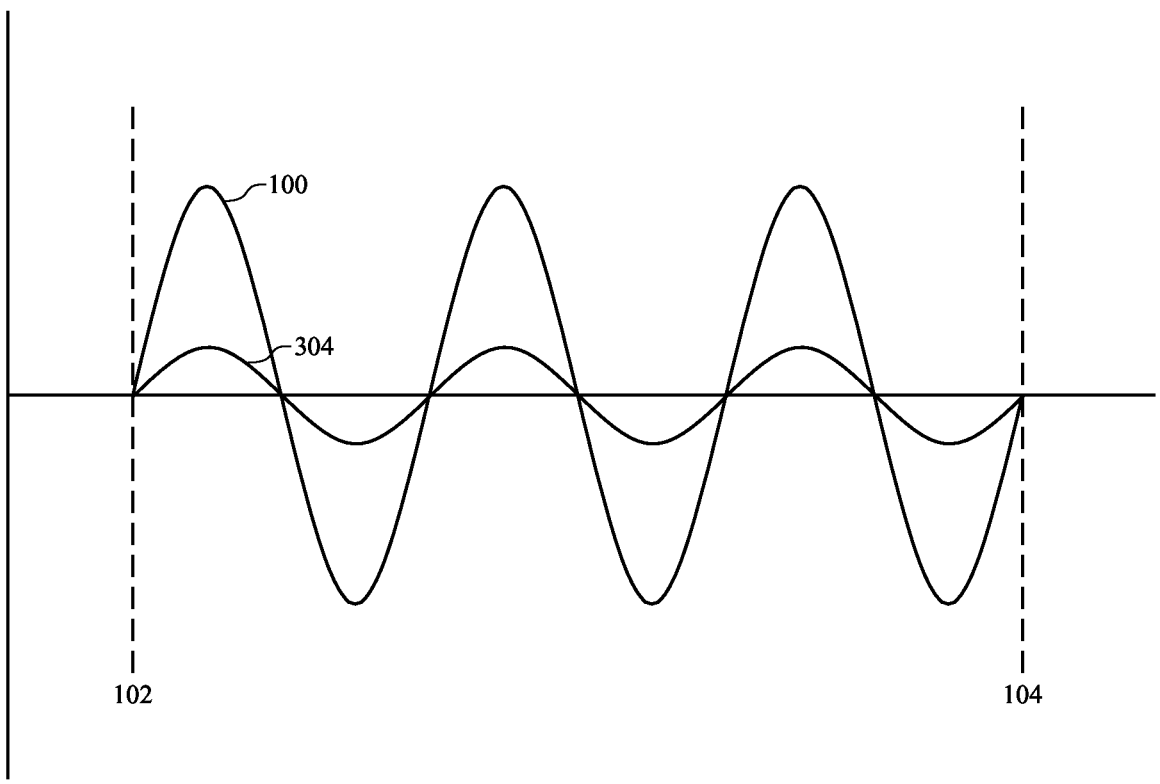

FIG. 3B illustrates a waveform 302 representative of detected motion of the device in response to the vibratory input represented by waveform 100, where the device is subject to relatively more damping than shown in FIG. 3A. This waveform may result when the device is in a user's pocket, purse, briefcase, or is otherwise supported by one or more objects that are more compliant than a hard surface, and, thus, provide greater damping. Further, FIG. 3C illustrates a waveform 304 representative of detected motion of the device in response to the vibratory input represented by waveform 100, where the device is subject to relatively more damping than shown in FIGS. 3A-3B. This waveform may result when the device is held securely in a user's hand or is securely strapped to a user's body (e.g., a smartwatch strapped to a user's wrist).

In each waveform shown and described above, the particular shape, amplitude, frequency, and other properties of the waveforms are for illustrative purposes only, and are not necessarily representative of the physical impulse applied to the device or motion that may result in any given implementation or under any given damping condition or influence. For example, in some embodiments, the device will oscillate for more or fewer cycles than shown above. Moreover, in some embodiments, the device will not vibrate or oscillate at all. For example, the device may move in only a single direction (such as may occur when the physical impulse is unidirectional), or the device may be physically damped to such an extent that the device does not oscillate as a result of the physical impulse. In such cases, the unidirectional motion is analyzed to determine the amount of damping to which the device is subjected.

Also, the waveforms in FIGS. 2A-3C represent only the motion of the device that is induced by the physical impulse (here, the vibratory motion represented in the waveform 100). However, other motion of the device may be present as well that is not represented in these waveforms, such as translational motion of the device caused by the user moving the device. Such motion may be filtered out prior to or as part of a damping analysis so as to isolate the induced motion from other motion that is not relevant for the damping analysis.

Further, in the foregoing discussion, the primary result of the damping on the motion of the device is an attenuation of the amplitude of the oscillatory motion. Other detectable changes to the motion may also be used to detect and/or measure the effect of the damping. For example, the damping may cause the frequency of the resulting oscillations to change. These, and any other appropriate detectable properties of motion resulting from the damping, may be used in a damping analysis.

Moreover, any appropriate technique for measuring and/or evaluating the resulting motion may be used. For example, the resulting motion may be analyzed to determine properties of a curve representative of the attenuation of the resulting motion. Properties of such a curve (e.g., a slope, a line of best fit, a rate of exponential decay, etc.) may be used to estimate the absolute or relative amount of damping to which the device is subjected. As another example, the resulting motion may be analyzed to determine how many times the device oscillates (e.g., how many times the waveform crosses the x-axis in FIGS. 2A-3C). In such cases, a greater number of oscillations may correspond to more damping, and a lower number of oscillations may correspond to less damping.

Finally, while the description of FIGS. 2A-3C correlate greater attenuation (and thus greater damping) with the properties of the objects that are supporting the device (e.g., whether the device is on a table or in a user's hand), this is merely one example of the properties that may affect and be measured by a damping analysis. For example, as noted above, attenuation of the amplitude of oscillations may indicate an amount of force being applied to the device incident to a touch-based interaction, or it may indicate a BMI or other body-composition of a wearer. Indeed, FIGS. 2A-3C may relate to any variable property or condition that affects the amount or quality of physical damping to which a device is subjected.

Figure 4A:
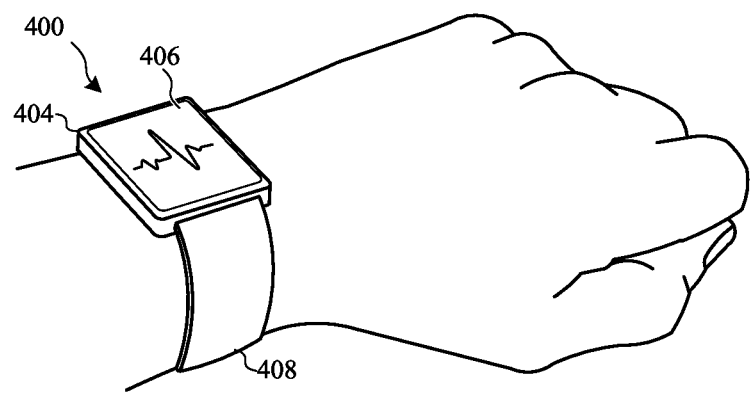
FIGS. 4A-4B depict perspective views of an example wearable electronic device, in accordance with some embodiments.

FIG. 4A depicts a perspective view of an example wearable electronic device 400 that may implement and/or embody the systems and methods described herein. Electronic device 400 is a wearable electronic device. Wearable electronic devices include any devices that are configured to be or are capable of being attached to the body of a user. Example wearable electronic devices may include smartphones, gaming devices, digital music players, sports accessory devices, medical devices, navigation assistants, accessibility devices, devices that provide time and/or weather information, health assistants, and other types of electronic devices suitable for attaching to a user. While FIG. 4A depicts a wearable electronic device, other devices that are not necessarily configured to be attached to a user may also implement or embody the systems and methods described herein. For example, smartphones, tablet computers, laptop computers, digital music players, and other types of electronic devices may also be used, regardless of whether they are configured to be or can be attached to a user.

In the illustrated embodiment, the wearable electronic device 400 is implemented as a portable electronic device that is worn on the wrist of a user. Other embodiments can implement the wearable electronic device differently (e.g., device configured to attach around a user's waist).

The wearable electronic device 400 includes a housing 404 and a display 406. In many examples, the display 406 may incorporate an input device configured to receive user input. For example, a user can provide input to the display 406 to control, manipulate, or otherwise interact with applications that are executed by the wearable electronic device 400.

The housing 404 can form an outer surface or partial outer surface and protective case for one or more internal components of the wearable electronic device 400. In the illustrated embodiment, the housing 404 is formed into a substantially rectangular shape, although this configuration is not required and other shapes are possible in other embodiments.

The display 406 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In many embodiments, the display 406 can have a resolution beyond 200 pixels per inch. In many embodiments, the display 406 can be disposed below a protective cover glass formed from a rigid and scratch resistant material such as ion-implanted glass, laminated glass, or sapphire.

As noted above, the display 406 can incorporate or be disposed proximate to an input sensor. For example, in some embodiments, the display 406 can also include one or more contact sensors to determine the position of one or more contact locations on a top surface of the display 406. For example, a contact sensor (such as a touch sensor or touch sensor array) can detect the location of one or more objects engaging the display 406, such as a stylus or a user's finger. In certain embodiments, a contact sensor can monitor an electrical property, such as conductance or capacitance.

Upon detecting that the electrical property has changed at a location or area of the display 406, the contact sensor can report that an object is contacting the input surface at the specified location or area. In many cases, contact sensors may report the locations of all objects engaging the input surface. For example, a contact sensor may report two independent contact locations when a user positions two fingers on the display 406.

The wearable electronic device 400 can include within the housing 404 a processor, a memory, a power supply and/or battery, network communications, sensors (e.g., health-related sensors, motion detectors, light sensors), display screens, acoustic elements, input/output ports, haptic elements (e.g., vibrating elements), digital and/or analog circuitry for performing and/or coordinating tasks of the wearable electronic device 400, and so on. For simplicity of illustration, the wearable electronic device 400 is depicted in FIG. 4A without many of these elements, each of which may be included, partially, optionally, or entirely, within the housing 404.

The wearable electronic device 400 can be coupled to a user via a band 408 that loops around the user's wrist. The band 408 can be formed from a compliant material, or into a compliant structure, that is configured to easily contour to a user's wrist, while retaining stiffness sufficient to maintain the position and orientation of the wearable electronic device on the user's wrist. In some embodiments, as described above, the band may be automatically adjusted (e.g., tightened or loosened) by the wearable electronic device 400.

Figure 4B:
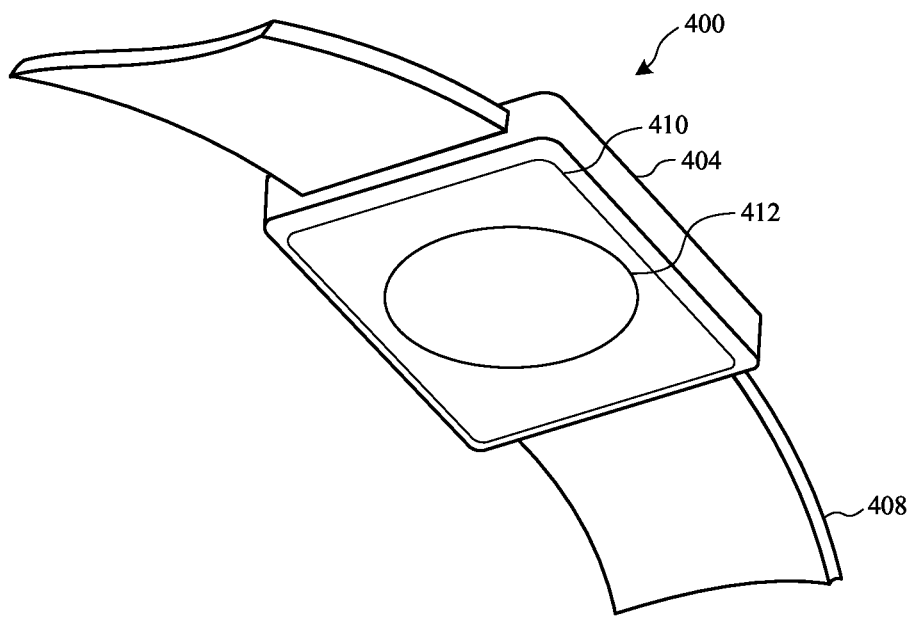

In some embodiments, the wearable electronic device 400 includes one or more sensors positioned on a bottom surface of the housing 404. FIG. 4B illustrates a perspective view of a bottom surface 410 of the housing 404, where the bottom surface 410 includes a body-contacting sensor surface 412. Sensors utilized by the wearable electronic device 400 can vary from embodiment to embodiment. Suitable sensors can include temperature sensors, electrodermal sensors, blood pressure sensors, heart rate sensors, respiration rate sensors, oxygen saturation sensors, plethysmographic sensors, activity sensors, pedometers, blood glucose sensors, body weight sensors, body fat sensors, blood alcohol sensors, dietary sensors, and so on.

In some embodiments, the body-contacting sensor surface 412 requires a certain amount of body contact (e.g., more than 70% of the surface area of the body-contacting sensor surface 412 must be in contact with the body of a user in order to acquire an accurate reading). As a specific example, certain sensors, such as PPG sensors, may be susceptible to noise associated with ambient light, proximity of the optical sensor and/or light source to the measurement site, and motion artifacts caused by the relative motion between the wearable electronic device 400 and the user. As a result, if the wearable electronic device 400 is not snugly fit to the user (at least while the PPG sensor is obtaining a measurement), the data obtained from the sensor may be sub-optimal (e.g., insufficient or insignificant magnitude) as a direct result of the improper fit. Alternatively, if the wearable electronic device 400 is snugly fit to the user, the data obtained from the sensor may be of substantially improved quality, magnitude, and clarity. In order to ensure that the body-contacting surface 412 of the sensor is in appropriate contact with the body of the user, systems and methods described herein may be used to detect that an amount of damping to which the device is subjected satisfies a condition, where the condition is indicative of the body-contacting sensor surface 412 being in sufficient contact with the user.

Figure 5:
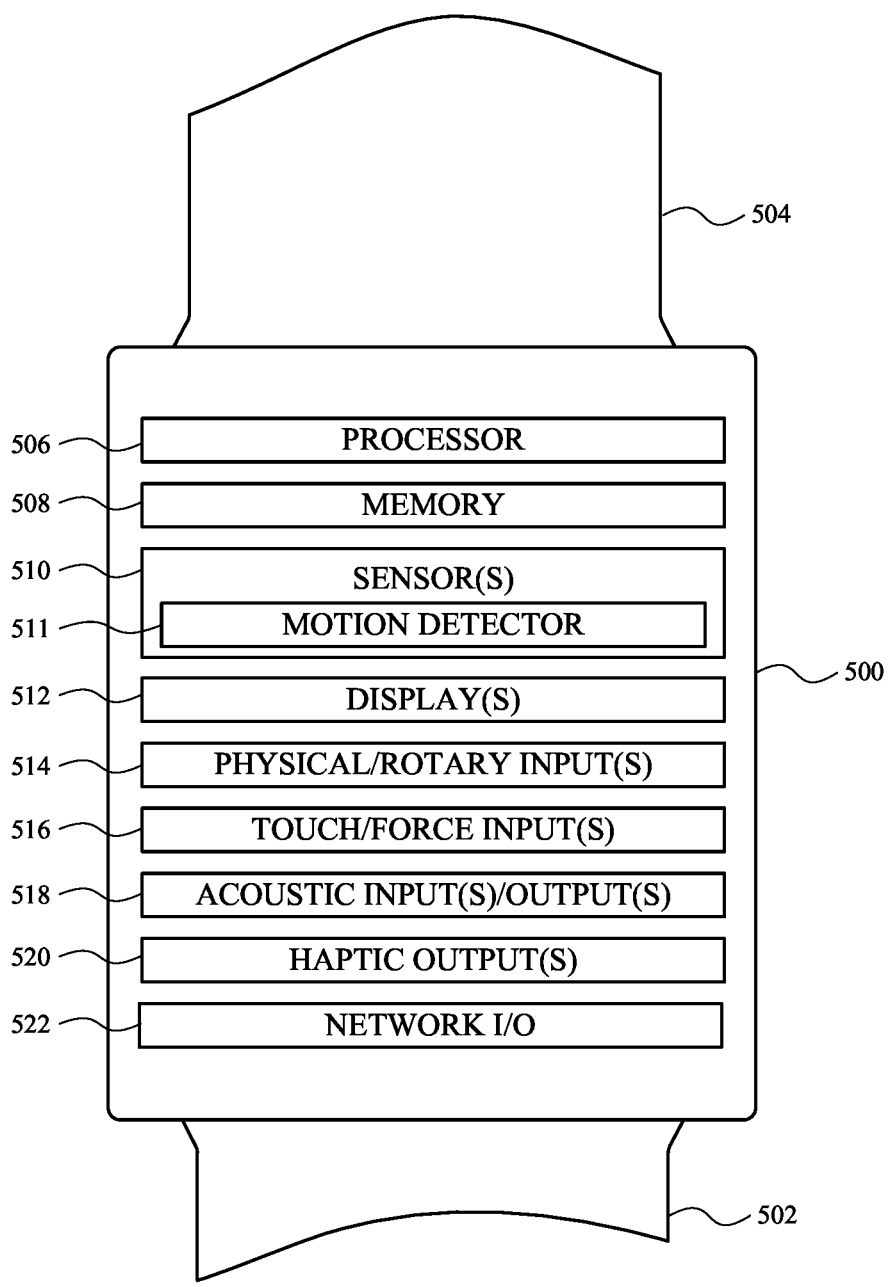
FIG. 5 depicts a simplified block diagram of a wearable electronic device.

FIG. 5 depicts a simplified block diagram of an electronic device 500. In some embodiments, the electronic device 500 corresponds to the wearable electronic device 400 in FIGS. 4A-4B. In some embodiments, however, the electronic device 500 is an electronic device that is not configured to be attached to a user, such as a laptop or tablet computer (though such devices may be held by or otherwise in contact with a user). The electronic device 500 can include one or more processing devices 506, memory 508, one or more input/output (I/O) devices or sensors 510 (e.g., biometric sensors, environmental sensors, motion detectors, etc.), one or more displays 512, one or more power source(s) (not shown), one or more physical and/or rotary input devices 514, one or more touch input device(s) 516 (e.g., a touch-sensitive surface for a touchscreen, a fingerprint sensor, and the like), one or more acoustic input and/or output devices 518, one or more haptic output device(s) 520 (e.g., rotating vibration motors, linear resonant actuators, and the like), and one or more network communication interface(s) 522.

In some embodiments, the device 500 includes more or fewer components than those shown above (including components that are not specifically discussed or shown). Moreover, components shown separately in the FIG. 5 may be combined in some embodiments, and components shown as a single component in FIG. 5 may be separated into multiple components.

The display 512 may provide an image or video output for the electronic device 500. The display 512 may also provide an input surface for one or more input devices such as a touch sensing device 516, and/or a fingerprint sensor. The display 512 may be any size suitable for inclusion at least partially within the housing of the electronic device 500 and may be positioned substantially anywhere on the electronic device 500. In some embodiments, the display 512 can be protected by a cover glass formed from a scratch-resistant material (e.g., sapphire, zirconia, glass, and so on).

The processing device(s) 506 can control or coordinate some or all of the operations of the electronic device 500. The processing device 506 can communicate, either directly or indirectly with substantially all of the components of the electronic device 500. For example, a system bus or signal line or other communication mechanisms can provide communication between the processing device 506, the memory 508, the I/O device(s) 510, the power source(s), the network communication interface 522, and/or the haptic output device 520.

The one or more processing devices 506 can be implemented as any electronic device capable of processing, receiving, or transmitting data or instructions. For example, the processing device(s) 506 can each be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 508 can store electronic data that can be used by the electronic device 500. For example, a memory can store electrical data or content such as, for example, audio and video files, documents and applications, device settings and user preferences, timing and control signals or data for the haptic output device 520, data structures or databases, and so on. The memory 508 can be configured as any type of memory. By way of example only, the memory can be implemented as random access memory, read-only memory, Flash memory, removable memory, or other types of storage elements, or combinations of such devices.

The one or more I/O device(s) 510 can transmit and/or receive data to and from a user or another electronic device. The I/O device(s) 510 can include a touch sensing input surface such as one or more buttons, one or more microphones or speakers, and/or one or more ports such as a microphone port.

The I/O device(s) 510 may also include one or more sensors positioned substantially anywhere on or in the electronic device 500. The sensor or sensors may be configured to sense substantially any type of characteristic such as, but not limited to, images, pressure, light, touch, force, temperature, position, motion, and so on. For example, the sensor(s) may be an image sensor, a temperature sensor, a light or optical sensor, an atmospheric pressure sensor, a humidity sensor, a magnet, a gyroscope, an accelerometer, and so on. In other examples, the electronic device 500 may include one or more health sensors. In some examples, the health sensors can be disposed on a bottom surface of the housing of the electronic device 500.

In some embodiments, the I/O device(s) 510 include a motion detector 511 that is used to detect motion that is induced in a device by a physical impulse. In some embodiments, the motion detector 511 includes any appropriate motion sensing or detecting component(s) and corresponding hardware, software, or firmware, for detecting, storing, and/or analyzing motion data. For example, the motion detector 511 may include or communicate with accelerometers, gyroscopes, and/or any other appropriate components.

The haptic output device 520 can be implemented as any suitable device configured to provide force feedback, vibratory feedback, tactile sensations, and the like. In some embodiments, haptic output devices 520 are used to provide tactile feedback to a user. For example, a vibrating haptic output device 520 may be activated in order to provide vibratory notifications to a user.

In some embodiments, the haptic output device 520 is configured to impart a physical impulse to the device 500 in order to induce motion of the device. Induced motion may then be detected and/or sensed by a sensor (e.g., the motion detector 511), and data representing the detected motion may be stored and/or analyzed by the device (e.g., by the processor 506). As described herein, in some embodiments, the physical impulse is a vibration. In some embodiments, the physical impulse is a unidirectional physical impulse, such as may be caused by a liner actuator contained within the device 500 causing a mass to be moved in a single direction.

In some embodiments, the haptic output device 520 that is used to induce motion of the device for sensing and analysis, as described herein, is the same haptic output device that is used for vibratory notifications and for providing force feedback to a user. Thus, a single haptic output device 520 may perform numerous functions, including traditional haptic output functions (e.g., a "vibrate" ringer or notification mode on a smartphone), as well as to provide physical impulses for damping analyses.

The network communication interface 522 can facilitate transmission of data to or from other electronic devices across standardized or proprietary protocols. For example, a network communication interface can transmit electronic signals via a wireless and/or wired network connection.

Examples of wireless and wired network connections include, but are not limited to, cellular, Wi-Fi, Bluetooth, infrared, and Ethernet.

Figure 6:
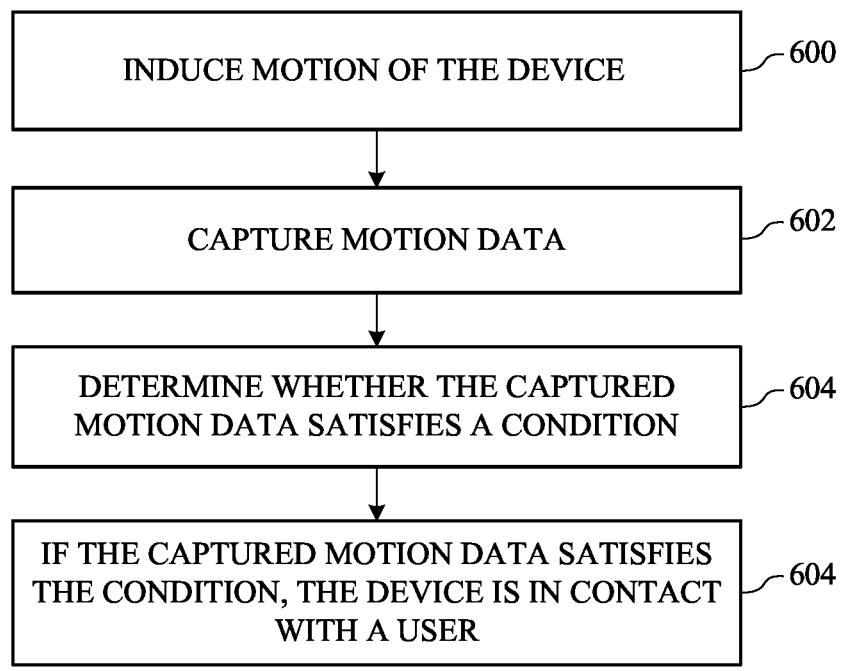
FIG. 6 is a flow chart that depicts example operations of a method of determining physical placement of a device, in accordance with some embodiments.

FIG. 6 is a flow chart that depicts example operations of a method of determining a physical placement of a device, in accordance with some embodiments. For example, the method described in FIG. 6 may be used to determine whether or not a device is (or probably is) in contact with a user's body (e.g., being held in the user's hand or strapped or otherwise attached to the user's body). The method in FIG. 6, and indeed the methods described with respect to each of FIGS. 6-12, leverage the fact that the physical damping to which a device is subject will change based on objects that may be physical contact with the device, including body parts of a user. Thus, properties or environmental conditions of the device (e.g., the properties of a user who is holding the device) may be determined, calculated, inferred, and/or estimated by analyzing the motion that is induced in the device by a physical impulse.

At operation 600, motion of a device is induced. Motion of the device may be induced by the application of a physical impulse to the device. In some embodiments, the physical impulse is imparted by activating a vibrating element, such as a haptic output device 520, as described above. Alternatively, in some embodiments, the physical impulse is a unidirectional impulse, which may also be imparted by activating a haptic output device 520. Any other appropriate technique for imparting a physical impulse to a device may also be used.

At operation 602, motion data representative of the induced motion of the device is captured. Motion data may be captured by the motion detector 511, as described herein. In some embodiments, motion data is captured after application of the physical impulse, as shown in FIGS. 2A-2C. In other embodiments, motion data is captured during application of the physical impulse, as shown in FIGS. 3A-3C.

Motion data may be any appropriate data that represents the motion of the device. For example, the motion data may include or correspond to the position of the device in space (e.g., x-y-z coordinates, or a subset thereof). As another example, motion data my include or correspond to accelerations of the device in one or more directions. As yet another example, motion data may correspond to a number of times that the device changed directions in response to a physical impulse (e.g., the number of inflection points of an oscillatory motion). In some embodiments, where the physical impulse is a vibration impulse, the induced motion may be an oscillatory motion. In such cases, the motion data may represent waveforms such as those depicted in FIGS. 2A-3C, though other appropriate motion data may also be used. Other types of motion data (and other techniques for capturing motion data) may also be used.

At operation 604, it is determined whether the captured motion data satisfies a first condition. In some embodiments, determining whether the captured motion data satisfies the first condition comprises determining whether the captured motion data is consistent with expected motion of the device when the device is in contact with the user.

In particular, in some embodiments, satisfaction of the first condition indicates that the device is subjected to a particular physical damping threshold. The first condition may be any condition that is indicative of the presence of a particular amount of physical damping. For example, as described above with respect to FIGS. 2A-2C, for induced oscillatory motion, the rate of decay of the peaks of the induced motion may be greater when the device is subjected to relatively more damping. Accordingly, the first condition may be that the rate of decay of the peaks is greater than a predetermined rate of decay. The predetermined rate of decay, in that case, may correspond to a rate of decay that is typically seen when the device is in contact with the user's body (though the predetermined rate may instead correspond to other conditions, such as when the device is on a table, or strapped securely to a user's wrist, and so on).

In some embodiments, the correlations between motion data and particular damping thresholds or conditions are determined experimentally. For example, a sample of a particular device may be placed in various physical environments (e.g., placed on a hard surface in various orientations, held in a user's hand, strapped to a user's body, and so forth). In each case, physical impulses may be applied to the devices and sample motion data may be collected. The sample motion data may then be used to determine what motion data is indicative of what physical damping conditions. From this information, the conditions against which captured motion data is compared (e.g., at operation 604) may be generated.

At operation 606, it is determined, based on operation 604, whether the device is in contact with a body of the user. For example, if the captured motion data satisfies the first condition (e.g., the oscillations of the induced motion decay at a rate greater than a predetermined rate), it may be determined that the device is in contact with the body of the user. As another example, if the captured motion data satisfies the first condition, it may be determined that the device is securely attached to the body of the user (e.g., a watch is strapped tightly to the user's wrist).

On the other hand, if the captured motion data satisfies a second condition (e.g., the oscillations of the induced motion decay at a rate that is less than the predetermined rate), it is determined that the device is not in contact with the body of the user. In some embodiments, satisfaction of the second condition equates to a failure to satisfy the first condition. In other embodiments, the first and second condition are discontinuous, such that a failure to satisfy the first condition does not necessarily correspond to satisfaction of the second condition. In the latter case, the failure of the captured motion data to satisfy either the first or the second condition may correspond to an indeterminate result. In other words, the damping to which the device is subjected cannot be correlated with a particular physical condition with an appropriate degree of certainty.

In some embodiments, if the first condition is satisfied, it is determined that the electronic device is securely attached to a user; if the second condition is satisfied, it is determined that the electronic device is being held by a user; and if a third condition is satisfied, it is determined that the electronic device is not in contact with a body of a user. In the foregoing example, the first, second, and third conditions may correspond to decreasing levels of detected or estimated damping.

The device may perform various actions (or refrain from taking various actions) based on a determination that the device is in contact with the body of a user (e.g., at operation 606). In some embodiments, a setting of the device is changed in response to determining that the device is in contact with a body of the user. For example, a setting that controls how a user is notified of certain events (e.g., incoming calls or messages) may be changed. As a specific example, if it is determined that the device is in contact with the body of the user, a notification setting may be changed so that the device vibrates to notify the user of one or more types of events, rather than playing a ringtone or sound alert. If it is determined that the device is not in contact with the body of the user, the notification setting may be changed so that the device uses audible alerts instead of or in addition to vibrations.

As another example, if it is determined that the device is in contact with the body of the user, the device may activate a sensing mode, whereby sensors that are configured to measure some aspect of a user's body (e.g., heart rate, blood oxygenation, blood pressure, etc.) are enabled. On the other hand, if it is determined that the device is not in contact with the body of the user, the device may deactivate the sensing mode in order to conserve power, as there is nothing for the sensors to sense.

As yet another example, if it is determined that the device is in contact with the body of the user, the device may enter a normal-power mode, where one or more components, applications, programs, or functions are active. For example, in a wearable electronic device such as a smartwatch, a normal-power mode may correspond to an activity tracking mode where motion detectors and health-related sensors (as well as associated applications and programs) sense and record information about the user's activities. On the other hand, if it is determined that the device is not in contact with the body of the user, the device may enter a low-power mode, where one or more components, applications, programs, or functions are inactive or otherwise in a state that consumes fewer resources (e.g., processor, memory, and/or power resources). For example, a wearable electronic device may deactivate a display screen when it is not being worn, in order to conserve battery life. Also, such a device may exit or terminate an activity tracking mode, as it would be a waste of battery power to actively sense and track activity when the device is not being worn or used.

As yet another example, if it is determined that the device is in contact with the body of the user, the device may become unlocked. In particular, a device may remain in a locked state whereby data, applications, or other functions of the device are inaccessible. Once the device is attached to a body of the user, the device may become unlocked to allow access.

Figure 7:
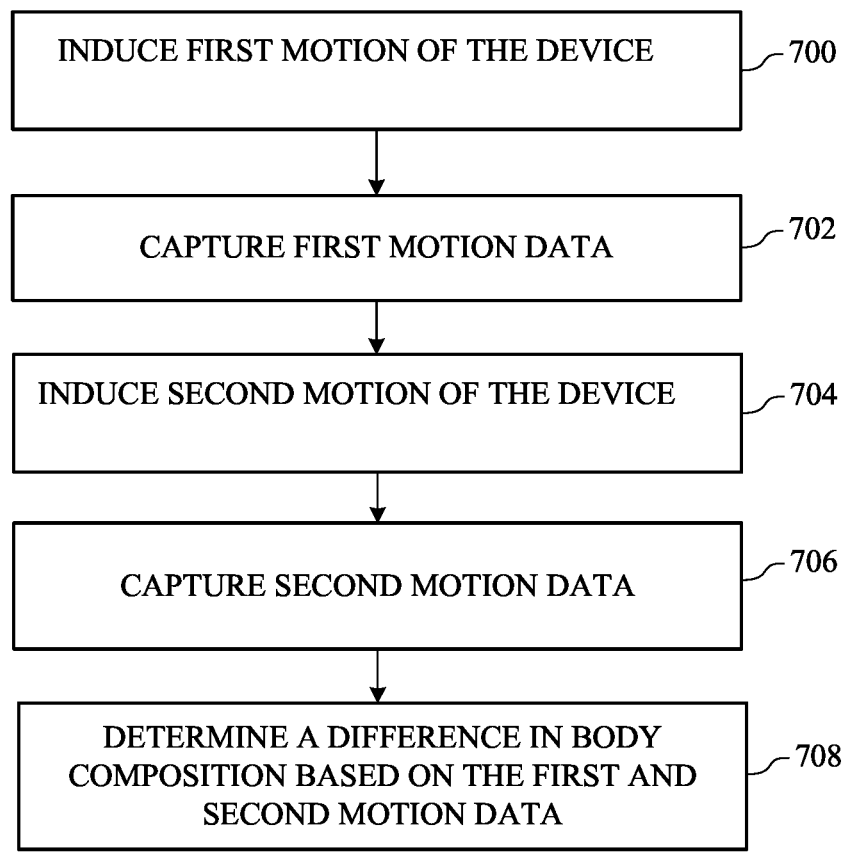
FIG. 7 is a flow chart that depicts example operations of a method of detecting a change in the body composition of a user of an electronic device, in accordance with some embodiments.

FIG. 7 is a flow chart that depicts example operations of a method of detecting a change in the body composition of a user of an electronic device, in accordance with some embodiments. At operation 700, first motion of a device is induced. Motion of the device may be induced by the application of a physical impulse (e.g., a vibratory impulse) to the device. At operation 702, first motion data representative of the first motion of the device is captured. At operation 704, which occurs at a time later than operation 700, second motion of a device is induced (e.g., by application of a vibratory impulse to the device). At operation 706, second motion data representative of the second motion of the device is captured. Examples of systems and methods for imparting physical impulses to a device and capturing motion data representative of induced motion are discussed, for example, with respect to operations 600 and 602, above.

At operation 708, based on the first and second motion data, a difference in body composition of the user between the first time and the second time is calculated. In particular, the physical damping applied to an electronic device by a human body may depend on the body composition of the user, including the user's body mass index, body water (the water content of a human body by volume or weight), body fat percentage, and the like. Accordingly, by performing a damping analysis at different times, it is possible to determine whether and to what extent the composition of the user's body has changed in the interim.

For example, a smartwatch that is configured to be worn on a user's wrist may perform a damping analysis at two separate times (operations 700-706), and may determine, based on the difference between the two damping analyses, whether the user's body composition has changed. In some embodiments, if less damping is detected by the later damping analysis, the device determines that the user's body mass index has decreased as compared to the earlier damping analysis. If more damping is detected by the later damping analysis, the device determines that the user's body mass index has increased as compared to the earlier damping analysis. In some embodiments, the device determines a quantitative measure of body mass index, as described below, in order to determine differences in a user's body mass over time. In particular, certain characteristics of detected motion data (e.g., the rate of decay of the peaks in the oscillatory motion induced by the physical impulse) and particular values for body mass index may be correlated. Accordingly, the device can determine, based on the results of a damping analysis, a particular body mass index may be determined.

The correlation between certain characteristics of detected motion data (e.g., the rate of decay of the peaks in the oscillatory motion induced by the physical impulse) and particular values for body mass index may be determined empirically, by performing damping analyses on users having known body mass indices. From these results, a correlation between motion data and body mass index values may be determined. The correlation may then be embedded into or otherwise accessible by a device in order to determine body mass index values based on damping analyses. In some embodiments, the correlation is implemented in a device as a lookup table, whereby results of a damping analysis (e.g., the rate of decay of the peaks in the oscillatory motion induced by the physical impulse) are input into a function, program, or routine, and a body mass index value is returned.

Body mass index values may also be stored so that a user can track his or her changes in body mass index. In some embodiments, past measurements of a user's body mass index values are presented in a chart that allows the user to see historical trends and progress.

While the foregoing example relates the amount of damping imparted by a user's body to a user's body mass index, any aspect of a user's body composition that is correlated to the amount of damping that the body imparts on a device may be used instead. For example, body mass index values may be replaced in the above example by body water, body fat percentage, muscle mass, or the like.

Figure 8:
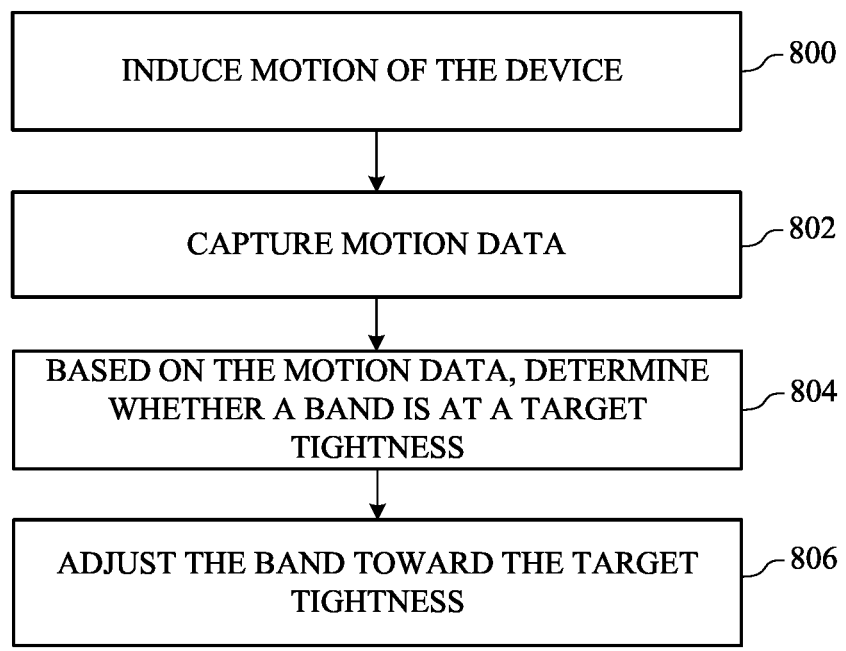
FIG. 8 is a flow chart that depicts example operations of a method of adjusting a fit of a band for an electronic device, in accordance with some embodiments.

FIG. 8 is a flow chart that depicts example operations of a method of adjusting a fit of a band for an electronic device, in accordance with some embodiments. In some embodiments, the method described with respect to FIG. 8 is performed at an electronic device that is coupled to a body of a user via a band. For example, the electronic device may be a smartwatch, where the band may be automatically adjusted to fit the user (e.g., by tightening and/or loosening the band), as described in U.S. patent application Ser. No. 14/691,217, now U.S. Pat. No. 9,781,984, which is hereby incorporated herein as if set forth fully in this document.

At operation 800, motion of a device is induced. Motion of the device may be induced by the application of a physical impulse (e.g., a vibratory impulse) to the device. At operation 802, first motion data representative of the motion of the device. Examples of systems and methods for imparting physical impulses to a device and capturing motion data representative of induced motion are discussed, for example, with respect to operations 600 and 602, above.

At operation 804, it is determined, based on the captured motion data, whether the band satisfies a particular target tightness. At operation 806, the band is adjusted toward the target tightness by tightening or loosening the band, depending on whether the band is determined to be looser or tighter, respectively, than the target tightness. If it is determined at operation 804 that the band is at the target tightness, the device takes no action and neither tightens nor loosens the band.

More particularly, at operation 804, it may be determined whether the band is looser than a target tightness. In accordance with a determination that the band is looser than the target tightness, the band is tightened. It may also or instead be determined at operation 804 whether the band is tighter than the target tightness. In accordance with a determination that the band is tighter than the target tightness, the band is loosened. It may also or instead be determined at operation 804 whether the band is substantially equal to the target tightness. In accordance with a determination that the band is at the target tightness, the band is neither tightened nor loosened.

In some embodiments, operations 804 and 806 are implemented by or result from implementation of a feedback loop, such as a proportional-integral-derivative feedback loop, also referred to as a PID loop (though other types of feedback loops or techniques for achieving a target result may be used). A target tightness value (or other value representative of the tightness of the band) is provided as an input to the feedback loop, and execution of the feedback loop by the device causes the band to be tightened or loosened (or neither), in accordance with the particular algorithm of the feedback loop, to attempt to reach the target tightness. Moreover, in some embodiments, operations 804 and 806 are repeated until the target tightness is reached, a process which may include both tightening of the band and loosening of the band. For example, the band may be tightened beyond the target tightness, and then loosened until the target tightness is reached.

In some embodiments, the method described in FIG. 8 is performed each time a user attaches the electronic device to his or her body. For example, a smartwatch may detect one or more conditions that indicate that a device may have been attached to a user, and then attempt to confirm whether the device is actually (or probably) attached to a user. As a specific example, a smartwatch may determine that it may have been attached to a user because it detected motion after a long period of detecting no motion. In response, the smartwatch may confirm whether or not it has been attached to the user by performing a damping analysis, as described with respect to FIG. 6. Once the device has confirmed (to a sufficient degree of certainty) that it is actually (or probably) attached to the user, the device may perform the method described with respect to FIG. 8 to adjust the band to the target tightness.

Of course, other techniques for determining whether the device is or probably is attached to a user may also be used. For example, the method described in FIG. 8 may be performed in response to an affirmative request by the user to adjust the band to a desired tightness (e.g., by the user interacting with an affordance on the device). Once it is determined, that the device is or probably is attached to the user, the device may perform the method described with respect to FIG. 8 in order to adjust the band to the target tightness.

In some embodiments, the target tightness is selected by the user. For example, during a calibration or initialization process for the device and/or the band, the user may manually adjust the band to a desired tightness. The device may then perform a damping analysis (e.g., imparting a physical impulse to the device and capturing motion data representative of the motion induced by the physical impulse), and store the results of the damping analysis (and/or interpreted results of the damping analysis). These results correspond to the target tightness, and may be used as a target value that the device seeks during later damping analyses in order to achieve the target tightness for the band.

Figure 9:
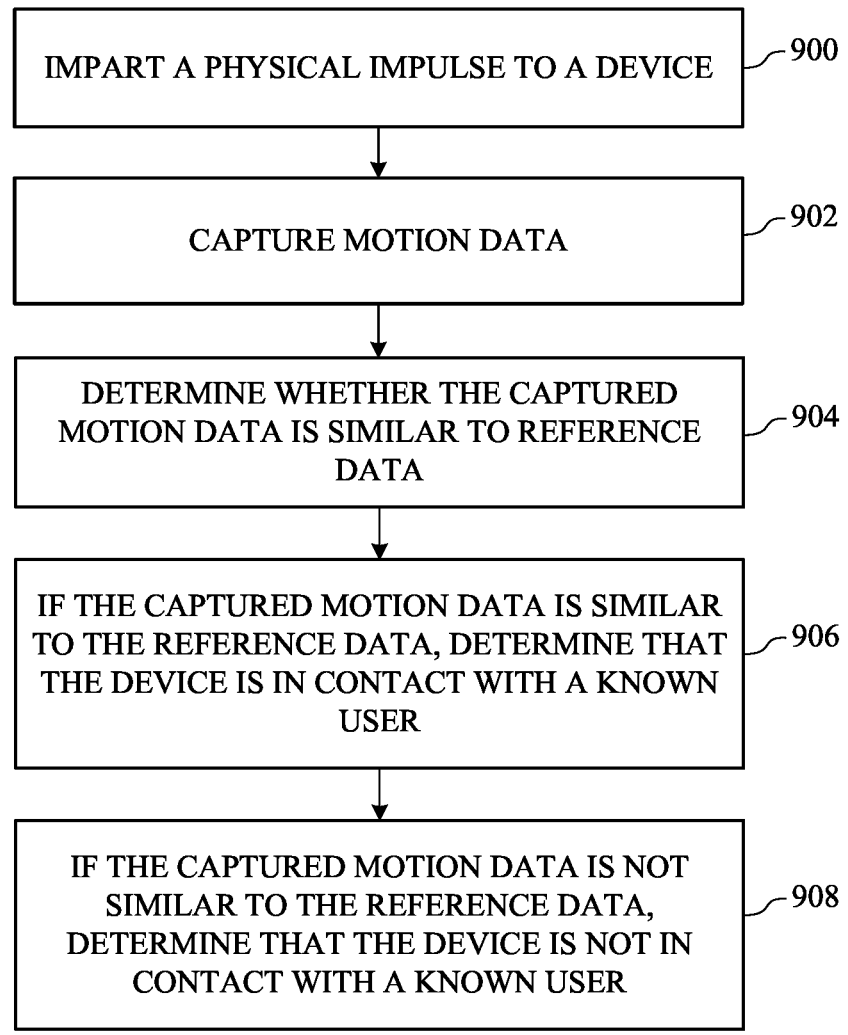
FIG. 9 is a flow chart that depicts example operations of a method of identifying a wearer of an electronic device, in accordance with some embodiments.

FIG. 9 is a flow chart that depicts example operations of a method of identifying a wearer of an electronic device, in accordance with some embodiments. For example, in some embodiments, the method includes determining whether a wearer of a device is a known user. At operation 900, a first physical impulse (e.g., a vibratory impulse) is imparted to a device. At operation 902, first motion data representative of the motion of the device caused by the first physical impulse is captured. Examples of systems and methods for imparting physical impulses to a device and capturing motion data representative of induced motion are discussed, for example, with respect to operations 600 and 602, above.

At operation 904, it is determined whether the captured motion data is within a similarity threshold to first reference motion data. The first reference motion data may correspond to an expected motion of the device in response to the physical impulse when the device is worn by a first user. In particular, the first reference motion data may correspond to motion that would be expected, in response to the physical impulse, if the electronic device is attached to the first user. Particular motion data may be expected when the device is attached to the first user because the body compositions of different users may result in the device being subjected to different levels of damping. If a known physical impulse is imparted to the device, then, the resulting motion may be sufficiently unique that the device can differentiate between different users. Accordingly, the device may compare the results of a damping analysis to expected results in order to determine whether the wearer is (or probably is) a known user.

In some embodiments, the first reference motion data is generated during a calibration or initialization procedure for the first user, whereby the device imparts a calibration physical impulse to the device (e.g., a vibratory impulse), and captures calibration motion data representative of the motion of the device caused by the physical impulse. The calibration motion data (and/or data derived from the calibration motion data) is then stored by the device and used as the reference data against which the motion data captured at operation 902 is compared.

Returning to FIG. 9, at operation 906, if it is determined that the captured motion data is within the similarity threshold (e.g., the captured motion data is sufficiently similar to the reference motion data), the device may determine that it is in contact with a first user. On the other hand, at operation 908, if it is determined that the captured motion data is not within the similarity threshold (e.g., the captured motion data is not sufficiently similar to the reference motion data), the device may determine that it is not in contact with the first user.

In some embodiments, the device will not operate, or will only operate with limited functionality, unless the device determines that it is being worn by a known user. For example, if it is determined that the device is attached to a known user, the device may become unlocked, such that the user has increased or full access to the applications, functions, and data of the device. In some embodiments, when the device is in a locked state, the device offers no or limited functionality. Thus, in some cases, the device will automatically unlock when it is worn by a known user, and will lock or remain locked when it is worn by an unknown user.

In some embodiments, multiple users may be registered with a device. In such cases, the operations 900-908 may be used determine which of multiple registered users are wearing the device, and configure the device for the particular wearer of the device. For example, the device may activate or select different settings depending on who is wearing the device. Settings may include notification settings, content control settings, accessibility settings, screen brightness settings, or any other setting(s) or parameter(s) of the device.

In some embodiments, the operations in FIG. 9 are performed when the device determines that it has been attached to a user. Example techniques for determining when a device has been attached to the user are discussed above. In particular, operations 900-908 may be initiated in response to detecting, via any appropriate technique, that the device has been or may have been attached to a user.

Figure 10:
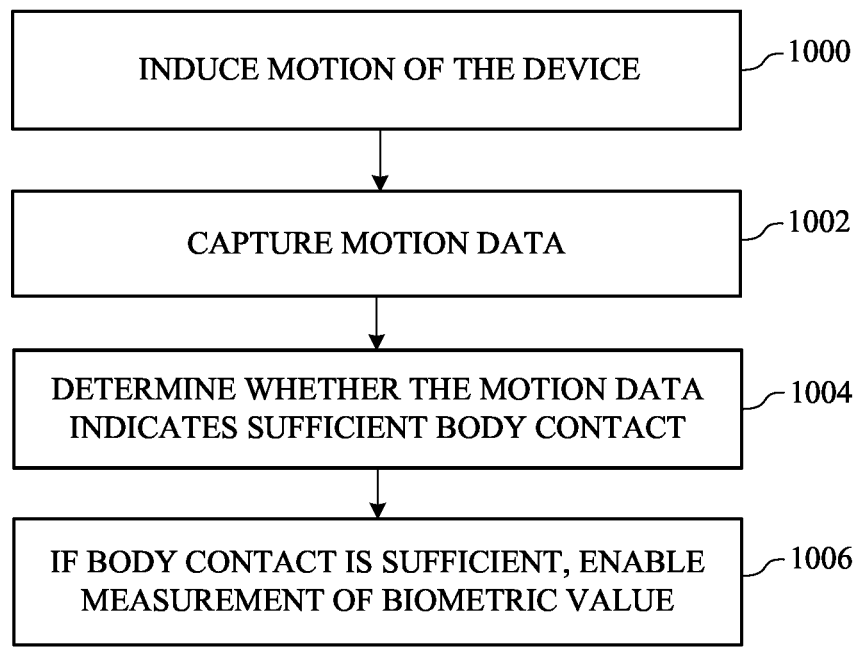
FIG. 10 is a flow chart that depicts example operations of a method of detecting contact between a sensor and a user, in accordance with some embodiments.

FIG. 10 is a flow chart that depicts example operations of a method of detecting contact between a sensor and a user, in accordance with some embodiments. For example, in some embodiments, an electronic device includes a biometric sensor that is designed to contact a body of a user in order to sense certain physical conditions and/or properties of the user, such as heart rate, blood oxygenation, and the like. FIG. 4 illustrates an example of a smartwatch having a biometric sensor with a body-contacting surface 412 that may implement the method described with respect to FIG. 10 in order to determine that the body-contacting sensor surface 412 is in contact with a body of the user.

At operation 1000, motion of a device is induced. Motion of the device may be induced by the application of a physical impulse (e.g., a vibratory impulse) to the device. At operation 1002, motion data representative of the motion of the device. Examples of systems and methods for imparting physical impulses to a device and capturing motion data representative of induced motion are discussed, for example, with respect to operations 600 and 602, above.

At operation 1004, it is determined whether the captured motion data satisfies a first condition, where the first condition indicates that an amount of the body-contacting sensor surface that is in contact with a body of a user satisfies a threshold value. At operation 1006, in accordance with a determination that the captured motion data satisfies the first condition, measurement of a biometric value with the biometric sensor may be enabled.

In particular, as described above with respect to the method of correlating body composition with motion data, sample damping analyses may be performed when a body-contacting sensor surface is in varying known amounts of contact with a user's body. Based on the sample analyses, it is possible to determine an amount of damping (e.g., represented by captured motion data having particular characteristics) that will be detected when the body-contacting sensor surface is in sufficient contact with the body of the user to enable accurate measurements. More particularly, it may be determined, from the sample damping analysis, that a particular amount of damping is detected when the body-contacting sensor surface is in sufficient contact with the user. This amount of damping may be used as the threshold value at operation 1004, such that, if the device detects motion data that represents less damping than the threshold value, the device will not enable the biometric sensor to take measurements.

In some embodiments, the method described with respect to FIG. 10 is performed prior to any measurements being taken by a biometric sensor, whether the measurement is initiated by the user, or automatically initiated by the device (e.g., as part of a pre-programmed measurement schedule). If it is determined that the body-contacting portion is in sufficient contact with the body of the user, the device may proceed to take a measurement. If it is determined that the body-contacting portion is not in sufficient contact with the body of the user, however, the device may alert the user to this fact, allowing the user to reposition or further secure the device. For example, a device with a display screen may present a visual prompt indicating that the sensor is not in sufficient contact with the user, and may also present instructions on what the user should do to improve the degree of contact (e.g., that the user should tighten a band or reposition the device to a different part of the user's body).

Figure 11:
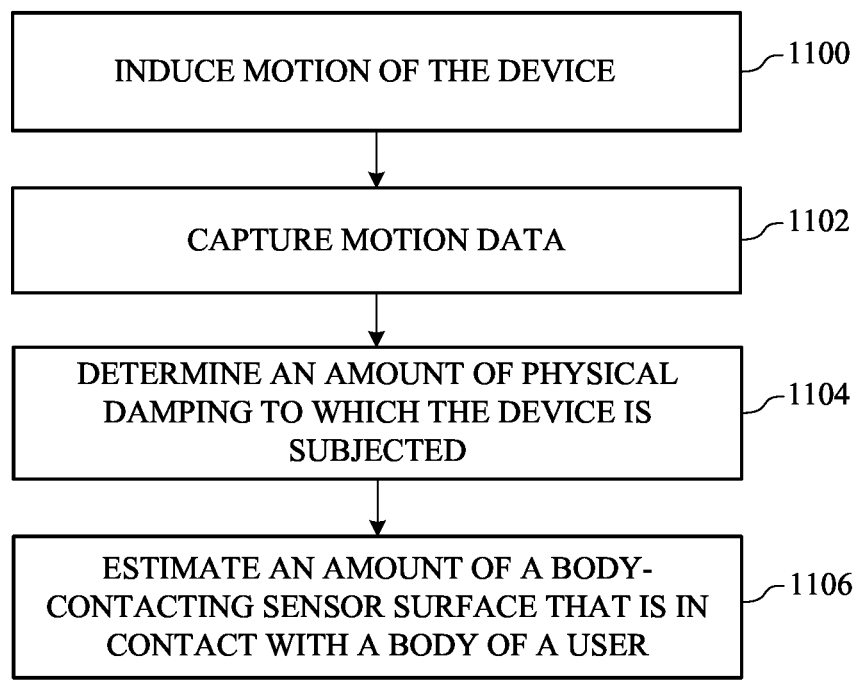
FIG. 11 is a flow chart that depicts example operations of a method of detecting an amount of body contact between a sensor and a user, in accordance with some embodiments.

FIG. 11 is a flow chart that depicts example operations of a method of detecting an amount of body contact between a sensor and a user, in accordance with some embodiments. For example, in some embodiments, an electronic device includes a biometric sensor that is designed to contact a body of a user in order to sense certain physical conditions and/or properties of the user, as described above. FIG. 4B illustrates an example of a smartwatch having a biometric sensor with a body-contacting surface 412 that may implement the method described with respect to FIG. 11.

The method described with respect to FIG. 11 may be used for similar purposes as the method described with respect to FIG. 10. However, instead of merely determining whether the sensor is in sufficient contact with the user's body to enable accurate measurements, the method described with respect to FIG. 11 may result in the determination of a quantitative measure of the body-contacting surface that is in contact with the user. For example, it may be possible to estimate or otherwise calculate what percentage of a body-contacting sensor surface is in contact with the body of the user.

At operation 1100, motion of a device is induced. Motion of the device may be induced by the application of a physical impulse (e.g., a vibratory impulse) to the device. At operation 1102, motion data representative of the motion of the device. Examples of systems and methods for imparting physical impulses to a device and capturing motion data representative of induced motion are discussed, for example, with respect to operations 600 and 602, above At operation 1104, an amount of physical damping to which the device is subjected is determined. This determination may be made based on the captured motion data. The amount of physical damping to which the device is subjected may be represented in any appropriate way. For example, the amount of physical damping may be represented by the rate of decay of the peaks of the induced motion, as described above. Alternatively or additionally, the amount of physical damping may be represented by the number of a number of times that the device changed directions in response to a physical impulse (e.g., the number of zero-crossings of waveforms such as those shown in FIGS. 2A-3C).

At operation 1106, an amount of the body-contacting sensor surface that is in contact with a body of the user is estimated, based on the amount of physical damping to which the device is subjected. For example, in some embodiments, the amount of the body-contacting sensor surface that is in contact with the body of the user is calculated as a percentage value (e.g., 70% of the body-contacting sensor surface is in contact with the user).

The method described with respect to FIG. 11 leverages the observation that a device is typically subjected to more damping when more of a surface device is in contact with a body of a user. For example, when a body-contacting sensor surface of a device is in full contact with the body of a user (e.g., 100% of the sensor surface is touching the user's skin), the user's body will impart greater physical damping to the device than would be the case if the surface is only in partial contact with the skin. (This relationship may be especially prominent for devices where the body-contacting sensor surface is the main contact point between the device and the user's body, as may be the case for the device 400 in FIGS. 4A-4B.) Accordingly, a correlation between certain characteristics of detected motion data and quantitative amounts of contact between the sensor surface and a user may be determined empirically, by performing damping analyses under conditions of known body-contact amounts (e.g., when the sensor surface is not in contact with a user, when the sensor surface is in 100% contact with a user, and various points therebetween). A device may then use the correlation between motion data and sensor contact values to determine how much of the sensor surface is in contact with a user based on the results of a particular damping analysis (e.g., by using a lookup table or algorithm that is based on and/or implements the empirically determined correlation between such values).

Once a particular amount of the sensor surface that is in contact with a user's body is determined, the amount of contact may be compared to a threshold value to determine whether the amount of contact is sufficient to enable accurate measurements by the sensor (as described with reference to FIG. 10). If it is determined that the amount of contact is not sufficient to enable accurate measurement, the device may prompt the user to reposition or further secure the device to increase the amount of contact. Further, if it is determined that the amount of contact is sufficient to enable accurate measurement, the device may enable the sensor to take a measurement, or directly the measurement to be taken.

Figure 12:
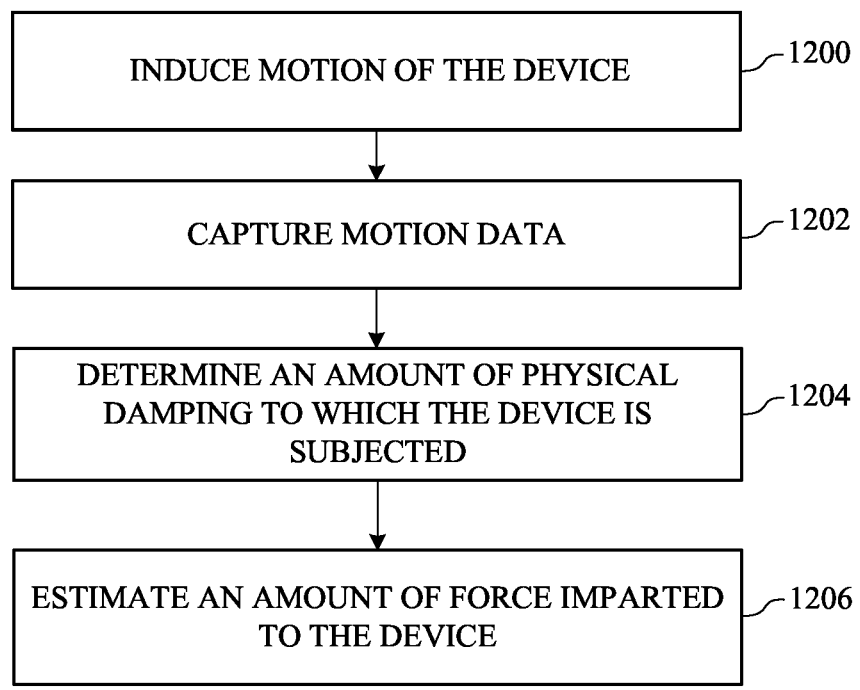
FIG. 12 is a flow chart that depicts example operations of a method of detecting a force of contact between a user and an electronic device, in accordance with some embodiments.

FIG. 12 is a flow chart that depicts example operations of a method of detecting a force of contact between a user and an electronic device, in accordance with some embodiments. In particular, users interact with devices that include touchscreens (e.g., smartphones and smart watches) by touching or pressing on the touchscreen. Frequently, touchscreens detect the location of the user's touch on the touchscreen surface in order to facilitate user input functions. For example, a display associated with a touch-sensitive surface may present an affordance (e.g., a virtual button) to a user, and if the user touches or presses an area of the touch-sensitive surface that corresponds to the affordance, the device may determine that the user has selected the affordance.

In addition to or instead of detecting the location of the contact with the device, it may be beneficial to determine the amount of force that the user is applying to the device when interacting with a touch-sensitive surface. Effectively, the amount of force becomes yet another possible input channel, over and above merely determining the location of the touch. Indeed, a user may be able to provide two inputs with a single touch of a touch screen. For example, in a device that includes music or media playback functionality, the force of a contact may be correlated with a speed of media seeking.

More particularly, a touchscreen may present a "skip forward" affordance. If a user taps and releases the affordance, the device may skip to the next track in a playlist or other queue of media content. On the other hand, if the user presses and holds the affordance, the device may skip forward within the currently playing track. In the latter case, the force of the contact may be used to determine a rate at which the device skips forward within the track. For example, a greater force may correspond to a higher rate of skipping. Of course, a similar technique may be used for skipping between or within media content items in reverse.

A similar technique may apply to various other user interactions that result in continuous change of an output or parameter. For example, when a user is scrolling through a website or application, the user may be able to change the scroll speed by varying the force with which he or she presses on the touchscreen (e.g., when pressing an arrow button or other affordance to scroll, rather than by swiping with a finger or stylus). As another example, when a user is changing the audio volume of a device, the volume may change faster if the user presses an affordance with greater force.

The method described with respect to FIG. 12 includes performing a damping analysis after detecting that a user is touching the device, and while a user is still touching the device. In particular, the force with which a user is touching the device will affect the amount of physical damping to which the device is subjected—a greater force will result in relatively more damping being applied to the device than a lesser force. This correlation may then be leveraged to determine a particular amount of force being applied to the device.

At operation 1200, motion of a device is induced. Motion of the device may be induced by the application of a physical impulse (e.g., a vibratory impulse) to the device. In some embodiments, the motion of the device is induced (e.g., the vibratory impulse is applied) in response to detecting a touch event between a user and the device. The touch event may be any touch-based input with the device, including interactions with a touchscreen, a physical button, or simply with the housing of the device itself. The touch event may be detected in any appropriate way. For example, the device may detect a touch event with a touchscreen by virtue of the touch-sensitive components associated with the touchscreen. As another example, the device may detect a touch event with a physical button by detecting physical actuation of the button (e.g., detecting a signal from a physical switch coupled to the button). As yet another example, the device may detect a touch event with a housing of the device by detecting an effect of the user's body (e.g., a finger) on the housing, such as by detecting a change in capacitance caused by contact of the user's finger with the device.

At operation 1202, motion data representative of the motion of the device. Examples of systems and methods for imparting physical impulses to a device and capturing motion data representative of induced motion are discussed, for example, with respect to operations 600 and 602, above.

At operation 1204, based on the captured motion data, an amount of physical damping to which the device is subjected is determined. The amount of physical damping to which the device is subjected may be represented in any appropriate way. For example, the amount of physical damping may be represented by the rate of decay of the peaks of the induced motion, as described above. Alternatively or additionally, the amount of physical damping may be represented by the number of a number of times that the device changed directions in response to a physical impulse (e.g., the number of zero-crossings of waveforms such as those shown in FIGS. 2A-3C). The amount of physical damping that is determined in operation 1204 need not be a quantitative measure of damping. Rather, it may be any measure that is representative of damping and/or that correlates to a particular amount of damping.

At operation 1206, an amount of force imparted to the device (e.g., to the touch-sensitive surface) by the user is estimated based on the amount of physical damping to which the device is subjected. In particular, a correlation between detected motion data and an amount of force applied to the device may be determined empirically. The correlation may then be implemented as a lookup table or algorithm and used by the device to estimate, from a given characteristic or characteristics of captured motion data, an amount of force applied. Of course, the correlations between physical damping and contact force may instead or additionally be determined in another appropriate way.

In some embodiments, correlations between force and damping are applicable to multiple users. In such cases, a provider of the device (e.g., a manufacturer or developer) may determine a single correlation between force and damping, and this correlation may be used as the basis for force estimation in all devices and by all users.

In some embodiments, on the other hand, correlations between force and damping are user-specific. In such cases, a user may perform a calibration routine during which a user applies different amounts of force to the device incident to a certain type of input. The device performs damping analyses during the inputs and generates a correlation between the amount of damping detected and the amount of force. As a specific example, a device may prompt a user to hold a device as they expect to during normal use (or attach the device to their body as they expect to during normal use), and then instruct the user to touch the touchscreen lightly. Once the device detects that the touch has occurred (and while the user is still touching the device), the device may perform a damping analysis. The device may then prompt a user to touch the touchscreen with greater force (e.g., as much force as they would be comfortable applying to the device during normal use). Once the device detects that this touch has occurred, the device once again performs a damping analysis. The device may then correlate (either via an algorithm, a lookup table, or otherwise) the high and low force inputs with the respective results of the damping analysis.

This correlation may be continuous, such that the device can determine not only whether future inputs correspond to the force imparted during the high or low calibration values, but can also estimate any amount of force therebetween. In some embodiments, the amount of force that is estimated at operation 1206 is a relative amount of force, rather than an absolute quantitative value. For example, the low force calibration input may be correlated with a value of zero, and the low force calibration input may be correlated with a 100. Accordingly, the amount of force estimated at operation 1206 may be any value between zero and 100. Of course, this is merely one way to scale the estimated amount of force; other scaling techniques may also be used.

In some embodiments, a linear correlation is used between the high and low force values and the corresponding damping results. In particular, if the damping results incident to a particular applied force are halfway between the results from the high and low calibration inputs, the device may determine that the applied force is half of the scaled force (e.g., 50% of maximum force). Other correlations may also be implemented.

Using user-specific calibration to correlate force and damping may help accommodate for differences in how users hold their devices, how tightly different users attach wearable devices to their body, the size of the contact areas of the fingers of different users, and/or any other property that may affect the amount of damping that the particular user imparts to the device and that may vary between users. For example, a user whose fingers have larger contact areas may impart relatively more damping to a touchscreen than a user whose fingers have smaller contact areas, even if those users are imparting the same amount of force to the device. Similarly, if one user wears a smartwatch tighter than another user, the smartwatch may detect different amounts of damping for the same amount of force (e.g., the tightness of the band may affect the detected damping, leading to different results for the same force applied by different users' touch inputs). Accordingly, the calibration routine may be used instead of or to supplement a default setting (e.g., a correlation determined by a provider of the device and pre-programmed into the device).

In some embodiments, the device stores and uses different correlations between damping and contact force depending on the type of input that is being analyzed. For example, a correlation that relates damping to an amount of force applied to a touchscreen of a device may be different than one that relates damping to an amount of force applied to a physical button on the device. In some embodiments, a distinct calibration routine is used for each type of input so as to determine user-specific correlations for each input type.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in other embodiments, where compatible. Likewise, the features of the different embodiments may be exchanged, substituted, or omitted where compatible and appropriate.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data.

We claim:

1. An electronic device, comprising:
    a housing;
    a display mounted within the housing;
    a physical impulse device mounted within the housing;
    a motion detector mounted within the housing;
    a band configured to attach the housing to a body part of a user; and
    a control system operably connected to the physical impulse device and the motion detector and configured to:
        determine the electronic device is worn on the body part of the user;
        responsive to determining the electronic device is worn on the body part of the user, cause the physical impulse device to induce motion of the electronic device;
        while the physical impulse device is inducing the motion of the electronic device, cause the motion detector to capture motion data representative of the induced motion of the electronic device;
        determine, using the captured motion data, the band is not at a target tightness; and
        responsive to determining the band is not at the target tightness, adjust the band toward the target tightness.

2. The electronic device of claim 1, wherein:
    the induced motion of the electronic device is an induced second motion of the electronic device, and the motion data is a second motion data; and
    the control system is further configured to determine the electronic device is worn on the body part of the user by,
        causing the physical impulse device to induce a first motion of the electronic device;
        while the physical impulse device is inducing the first motion of the electronic device, causing the motion detector to capture first motion data representative of the induced first motion;
        determine the captured first motion data satisfies a condition indicating that the electronic device meets a physical damping threshold, the physical damping threshold based on reference motion data associated with the electronic device being in contact with the body part of the user; and
        responsive to the determination the captured motion data satisfies the condition, determining the electronic device is worn on the body part of the user.

3. The electronic device of claim 1, wherein the control system is configured to, when the electronic device is worn on the body part of the user, execute a proportional-integral-derivative feedback loop including:
    the causing the physical impulse device to induce the motion;
    the capturing the motion data;
    the determining the band is not at the target tightness; and
    the adjusting the band toward the target tightness.

4. The electronic device of claim 1, wherein the control system is configured to receive a selection of the target tightness.

5. The electronic device of claim 1, wherein:
    the control system is configured to, when the electronic device is worn on the body part of the user,
        receive, from the user, an indication that the band is at the target tightness;
        perform a damping analysis in response to receiving the indication from the user; and
        store, as an indicator of the target tightness, at least one of a result of the damping analysis, or an interpreted result of the damping analysis, or a value determined from the damping analysis.

6. The electronic device of claim 1, wherein the physical impulse device comprises a haptic output device.

7. The electronic device of claim 1, wherein determining the band is not at the target tightness comprises determining the band is tighter than the target tightness.

8. The electronic device of claim 1, wherein determining the band is not at the target tightness comprises determining the band is looser than the target tightness.

9. The electronic device of claim 1, wherein the electronic device is a smartwatch.

10. The electronic device of claim 1, wherein the electronic device is at least one of a fitness tracking device or a health tracking device.

11. A smartwatch, comprising:
    a housing;
    a health sensor mounted within the housing;
    a haptic output device mounted within the housing;
    a motion detector mounted within the housing;
    a band configured to attach the housing to a body part of a user with the health sensor facing the body part of the user; and
    a control system operably connected to the haptic output device and the motion detector and configured to:
        cause the haptic output device to induce motion of the smartwatch;
        while the haptic output device is inducing the motion of the smartwatch, cause the motion detector to capture motion data representative of the induced motion of the smartwatch;
        determine the captured motion data does not satisfy a condition indicating that the smartwatch is subjected to a physical damping threshold, the physical damping threshold based on reference motion data associated with the health sensor being in contact with the body part of the user; and
        responsive to determining the captured motion data does not satisfy the condition, adjust the band toward a target tightness.

12. The smartwatch of claim 11, wherein the health sensor is configured to sense at least one of a heart rate, a blood oxygenation, or a blood pressure.

13. The smartwatch of claim 11, wherein:
the control system is configured to,
  after adjusting the band, cause the haptic output device to induce additional motion of the smartwatch;
  while the haptic output device is inducing the additional motion of the smartwatch, cause the motion detector to capture additional motion data representative of the induced additional motion of the smartwatch;
  determine the captured additional motion data does satisfies the condition indicating that the smartwatch is subjected to the physical damping threshold; and
  responsive to determining the captured additional motion data satisfies the condition, transition at least the health sensor from a low-power mode to a normal-power mode.

14. The smartwatch of claim 11, wherein the control system is configured to receive a selection of the target tightness.

15. The smartwatch of claim 11, wherein:
the control system is configured to,
  receive, from the user, an indication that the band is at the target tightness;
  perform a damping analysis in response to receiving the indication from the user; and
  store, as an indicator of the target tightness, at least one of a result of the damping analysis, or an interpreted result of the damping analysis, or a value determined from the damping analysis.

16. A method of positioning a health sensor against a body part of a user, comprising:
  inducing motion of an electronic device, the motion induced by a processor of the electronic device actuating a haptic output device housed within the electronic device;
  while inducing the motion of the electronic device, capturing motion data representative of the induced motion of the electronic device, the motion data captured by a motion sensor housed within the electronic device;
  determining, by the processor, the captured motion data does not satisfy a condition indicating that the electronic device is subjected to a physical damping threshold, the physical damping threshold based on reference motion data associated with the health sensor being in contact with the body part of the user; and
  responsive to the processor determining the captured motion data does not satisfy the condition, prompting the user, under control of the processor, to adjust a band attaching the electronic device to the body part of the user toward a target tightness.

17. The method of claim 16, further comprising:
detecting the adjustment; and
transitioning at least the health sensor from a low-power mode to a normal-power mode after detecting the adjustment.

18. The method of claim 16, further comprising:
operating the health sensor, after the adjustment and under control of the processor, to sense at least one of a heart rate, a blood oxygenation, or a blood pressure.

19. The method of claim 16, wherein the electronic device is a smartwatch.

20. The method of claim 16, further comprising:
when prompting the user, visually instructing the user, under control of the processor, on what the user should do to improve contact between the health sensor and the body part of the user.

* * * * *